United States Patent
Higuma et al.

(10) Patent No.: US 8,727,455 B2
(45) Date of Patent: May 20, 2014

(54) BRAKE CONTROL APPARATUS

(75) Inventors: Motohiro Higuma, Atsugi (JP); Kotaro Koyama, Isehara (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 237 days.

(21) Appl. No.: 13/277,491

(22) Filed: Oct. 20, 2011

(65) Prior Publication Data

US 2012/0161504 A1 Jun. 28, 2012

(30) Foreign Application Priority Data

Dec. 24, 2010 (JP) ................. 2010-288389

(51) Int. Cl.
*B60T 8/64* (2006.01)

(52) U.S. Cl.
USPC ............. 303/151; 303/155; 303/113.4

(58) Field of Classification Search
USPC .............. 303/151, 152, 155, 113.4
See application file for complete search history.

(56) References Cited

U.S. PATENT DOCUMENTS

| | | | |
|---|---|---|---|
| 6,464,307 B1* | 10/2002 | Yoshino ............. | 303/11 |
| 6,494,547 B2* | 12/2002 | Higashimura et al. ........ | 303/152 |
| 7,559,613 B2 | 7/2009 | Kokubo | |
| 2005/0162010 A1* | 7/2005 | Kamiya et al. .......... | 303/113.4 |
| 2006/0119173 A1 | 6/2006 | Kokubo | |
| 2008/0106143 A1* | 5/2008 | Yazaki et al. ........... | 303/13 |
| 2010/0187901 A1* | 7/2010 | Sonoda et al. ........... | 303/11 |

FOREIGN PATENT DOCUMENTS

JP 2006-159949 A 6/2006

OTHER PUBLICATIONS

U.S. Appl. No. 13/277,241, filed Oct. 20, 2011, Koyama.

* cited by examiner

*Primary Examiner* — Bradley King
(74) *Attorney, Agent, or Firm* — Foley & Lardner LLP

(57) ABSTRACT

A brake control apparatus for a vehicle having a regenerative braking system, has first to fourth brake circuits, a pump, a gate-out valve, an inflow valve, an outflow valve, a reservoir, a fluid suction cylinder, a branch oil passage, a switch valve, a regulation valve, and a hydraulic pressure control unit. The hydraulic pressure control unit controls a brake fluid pressure by operating the gate-out valve, the inflow valve, the outflow valve, the switch valve and the pump in accordance with a regenerative operation state of the regenerative braking system. Also the hydraulic pressure control unit stores the brake fluid flowing out from a master cylinder in the fluid suction cylinder by operating the pump when the regenerative braking system works, and supplies the brake fluid stored in the fluid suction cylinder to a wheel cylinder when a regenerative braking amount of the regenerative braking system lowers.

19 Claims, 10 Drawing Sheets

BRAKE CONTROL APPARATUS

BACKGROUND OF THE INVENTION

The present invention relates to a brake control apparatus.

A related art brake control apparatus has been disclosed in, for example, Japanese Patent Provisional Publication No. 2006-159949 (hereinafter is referred to as "JP2006-159949").

In a related art brake control apparatus in JP2006-159949, during execution of a regenerative brake cooperative control, brake fluid that flows out from a master cylinder is sucked or absorbed into a stroke simulator, thereby generating pedal feel.

SUMMARY OF THE INVENTION

In the related art brake control apparatus, however, there are still needs for further improvement in the pedal feel upon the execution of the regenerative brake cooperative control.

It is therefore an object of the present invention to provide a brake control apparatus that is capable of improving the pedal feel upon the execution of the regenerative brake cooperative control.

According to one aspect of the present invention, a brake control apparatus used for a vehicle having a regenerative braking system, comprises: a pump provided in a brake circuit; a first brake circuit connecting a master cylinder that generates a brake fluid pressure by driver's brake operation and a wheel cylinder that is configured so that the brake fluid pressure acts on; a second brake circuit connecting the first brake circuit and an outlet side of the pump; a gate-out valve provided at a master cylinder side with respect to a connection point of the second brake circuit, on the first brake circuit; a third brake circuit connecting a point positioned at the master cylinder side with respect to the gate-out valve and an inlet side of the pump, on the first brake circuit; an inflow valve provided at a wheel cylinder side with respect to the connection point of the second brake circuit, on the first brake circuit; a fourth brake circuit connecting a point positioned at the wheel cylinder side with respect to the inflow valve and the inlet side of the pump, on the first brake circuit; an outflow valve provided on the fourth brake circuit; a reservoir provided, on the fourth brake circuit, at the inlet side of the pump with respect to the outflow valve and connecting to the third brake circuit; a fluid suction cylinder into which the brake fluid can flow; a branch oil passage branching off from a point between the connection point of the second brake circuit and the gate-out valve on the first brake circuit and connecting to the fluid suction cylinder; a switch valve provided on the branch oil passage; a regulation valve provided on the third brake circuit and regulating an amount of the brake fluid that flows into the reservoir from the master cylinder; and a hydraulic pressure control unit controlling the brake fluid pressure by operating the gate-out valve, the inflow valve, the outflow valve, the switch valve and the pump in accordance with a regenerative operation state of the regenerative braking system.

According to another aspect of the present invention, a brake control apparatus used for a vehicle having a regenerative braking system, comprises: a pump that can pump up brake fluid in a master cylinder; a first brake circuit connecting a master cylinder that generates a brake fluid pressure by driver's brake operation and a wheel cylinder that is configured so that the brake fluid pressure acts on; a second brake circuit connecting the first brake circuit and an outlet side of the pump; a gate-out valve provided at a master cylinder side with respect to a connection point of the second brake circuit, on the first brake circuit; a third brake circuit connecting a point positioned at the master cylinder side with respect to the gate-out valve and an inlet side of the pump, on the first brake circuit; an inflow valve provided at a wheel cylinder side with respect to the connection point of the second brake circuit, on the first brake circuit; a fourth brake circuit connecting a point positioned at the wheel cylinder side with respect to the inflow valve and the inlet side of the pump, on the first brake circuit; an outflow valve provided on the fourth brake circuit; a reservoir provided, on the fourth brake circuit, at the inlet side of the pump with respect to the outflow valve and connecting to the third brake circuit; an accumulator into which the brake fluid can flow, the accumulator being able to store the brake fluid flowing into the accumulator; a branch oil passage branching off from a point between the connection point of the second brake circuit and the gate-out valve on the first brake circuit and connecting to the accumulator; a switch valve provided on the branch oil passage; and a regulation valve provided on the third brake circuit and regulating an amount of the brake fluid that flows into the reservoir from the master cylinder, and when the regenerative braking system works, the brake fluid flowing out from the master cylinder by the driver's brake operation is stored in the accumulator by a pump operation of the pump through the third brake circuit, the regulation valve, the reservoir, the second brake circuit, the first brake circuit and the branch oil passage.

According to a further aspect of the invention, a method of brake control for a vehicle having a regenerative braking system, the vehicle provided with a master cylinder, a wheel cylinder provided at a vehicle wheel, a brake circuit between the master cylinder and the wheel cylinder, a pump and a fluid suction cylinder both provided in the brake circuit, the method comprises: storing brake fluid that flows out from the master cylinder by the driver's brake operation in the fluid suction cylinder by operating the pump when the regenerative braking system works; and supplying the brake fluid stored in the fluid suction cylinder to the wheel cylinder when a regenerative braking amount of the regenerative braking system lowers.

The other objects and features of this invention will become understood from the following description with reference to the accompanying drawings.

DETAILED DESCRIPTION OF THE INVENTION

Embodiments of a brake control apparatus of the present invention will be explained below with reference to the drawings.

The embodiments explained below are designed to meet various needs. The improvement of the pedal feel upon the execution of the regenerative brake cooperative control is one of the various needs. The following embodiments are also designed to meet the needs for improvement in a pressure increase response of a wheel cylinder in the regenerative brake cooperative control and in the ABS control.

[Embodiment 1]

First, a system will be explained.

Figure 1:
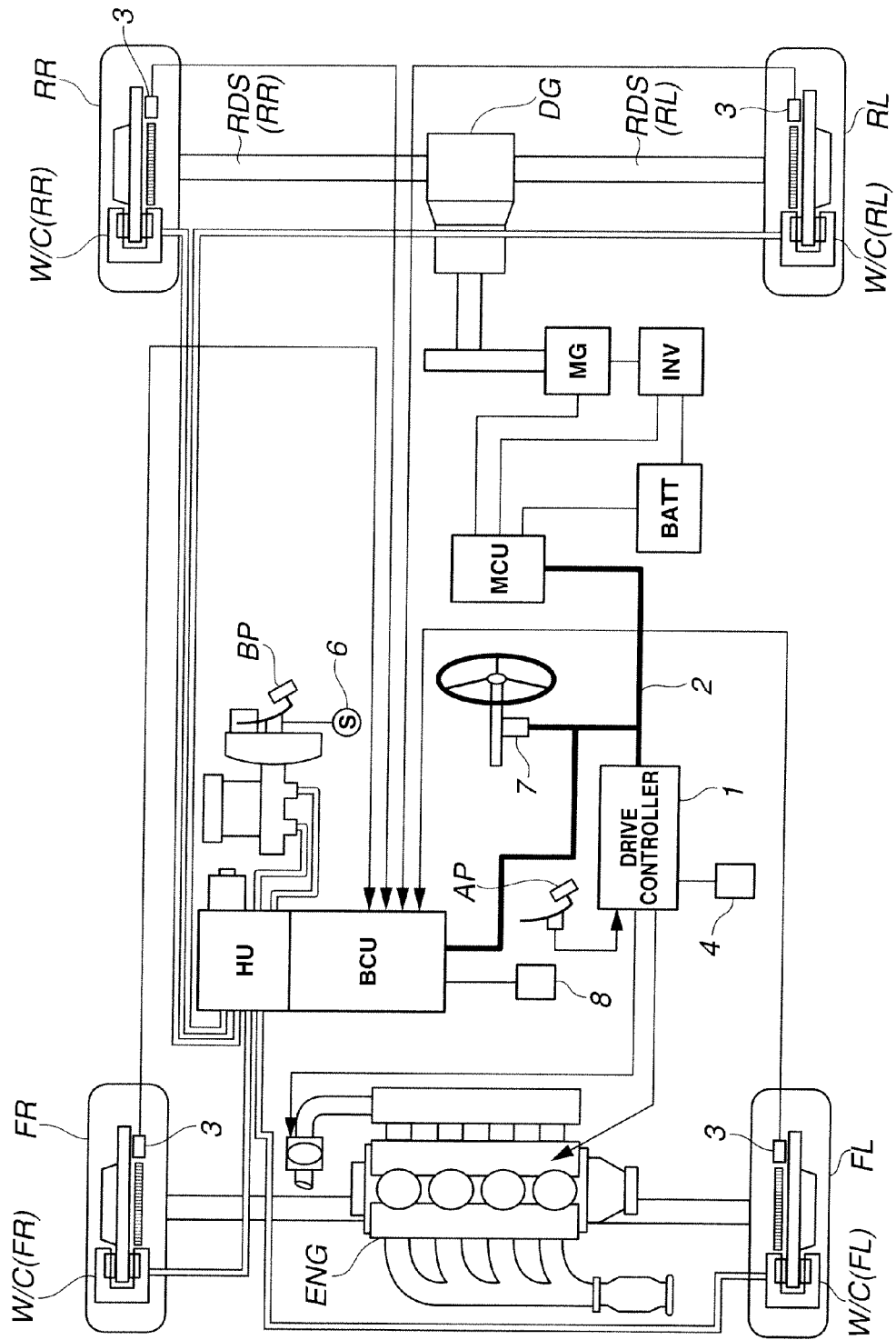
FIG. 1 is a system block diagram showing a brake system in a vehicle, using a brake control apparatus of an embodiment 1.
Figure 2:
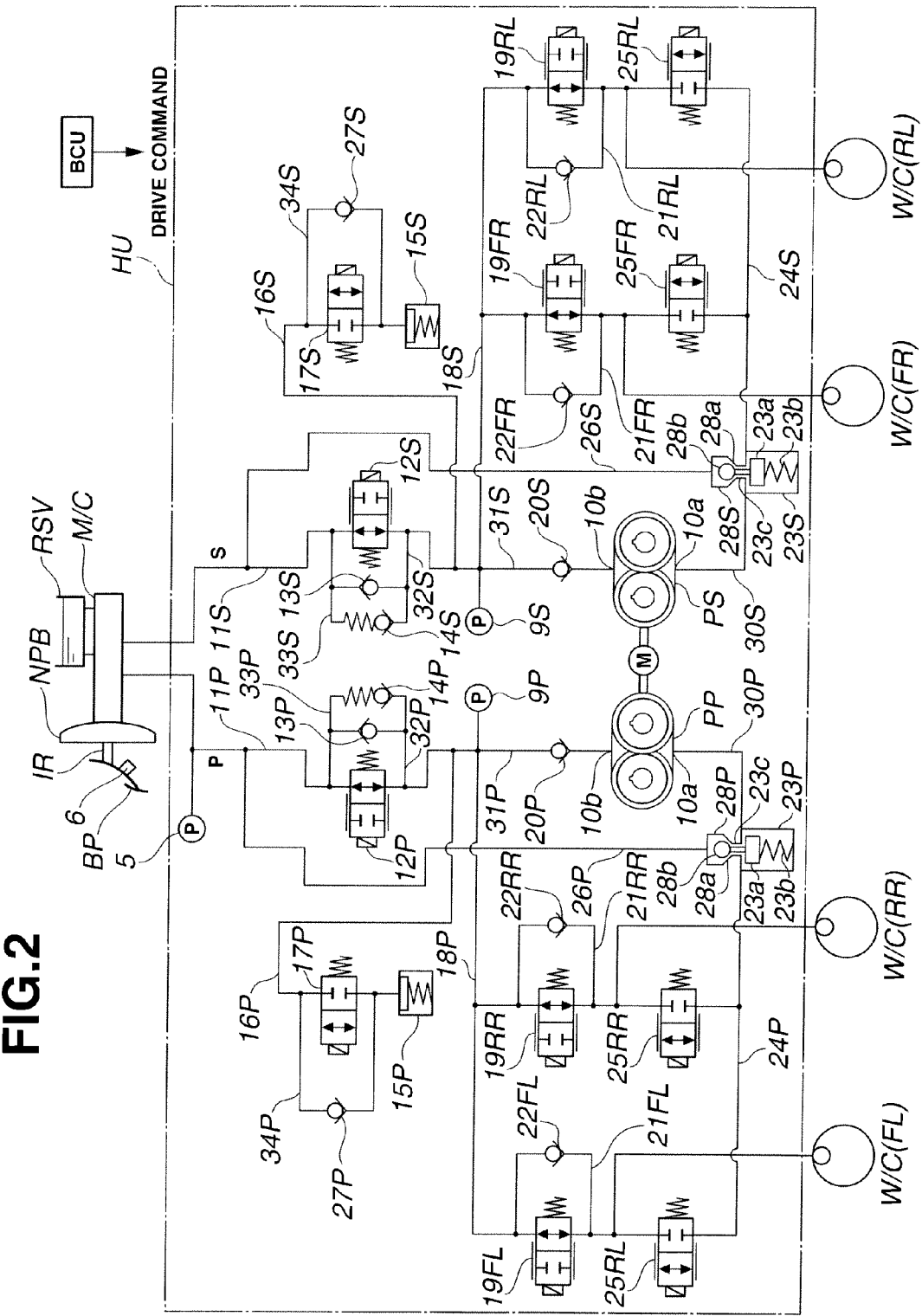
FIG. 2 is a hydraulic circuit of the brake control apparatus of the embodiment 1.

FIG. 1 is a system block diagram showing a brake and drive system in a vehicle, using a brake control apparatus of an embodiment 1. FIG. 2 is a hydraulic circuit of the brake control apparatus of the embodiment 1.

[System Configuration]

A hydraulic pressure control unit HU increases or decreases or holds each hydraulic pressure of a wheel cylinder W/C (FL) of a front left wheel FL, a wheel cylinder W/C (RR) of a rear right wheel RR, a wheel cylinder W/C (FR) of a front right wheel FR and a wheel cylinder W/C (RL) of a rear left wheel RL, on the basis of a friction braking force command from a brake control unit (a hydraulic pressure control unit or section) BCU.

A motor/generator MG is a three-phase AC motor and is connected to rear drive shafts RDS (RL), RDS (RR) of the rear left and rear right wheels RL, RR through a differential gear DG. The motor/generator MG performs a power running operation or a regenerative operation and provides a driving force or a regenerative braking force to the rear wheels RL and RR on the basis of a command from a motor control unit MCU.

An inverter INV converts DC power of a battery BATT to AC power and supplies the power to the motor/generator MG on the basis of a drive command from the motor control unit MCU, then the power running operation of the motor/generator MG is carried out. On the other hand, the inverter INV converts AC power generated in the motor/generator MG to DC power and charges the battery BATT on the basis of a regenerative command from the motor control unit MCU, then the regenerative operation of the motor/generator MG is carried out.

The motor control unit MCU outputs the drive command to the inverter INV on the basis of a driving force command from a drive controller 1. Also the motor control unit MCU outputs the regenerative command to the inverter INV on the basis of a regenerative braking force command from the brake control unit (the hydraulic pressure control section) BCU.

The motor control unit MCU sends information of state of an output control of the driving force or the regenerative braking force by the motor/generator MG and a generatable maximum regenerative braking force at this time point to the brake control unit BCU and the drive controller 1 through a communication line 2. Here, with regard to the generatable maximum regenerative braking force, it is calculated from, for example, a battery SOC that is estimated from a terminal voltage and a current value of the battery BATT or a vehicle speed that is calculated (estimated) by a wheel speed sensor 3.

Further, a steering characteristic of the vehicle is also taken into consideration when cornering.

That is, in a case where the battery BATT is in a fully charged state or an almost fully charged state, there is a need to prevent overcharging in terms of battery protection. Further, when the vehicle speed decreases by the braking, the generatable maximum regenerative braking force by the motor/generator MG is reduced. Furthermore, when performing the regenerative braking during a high speed running, a load of the inverter INV becomes high. Thus the maximum regenerative braking force is limited during the high speed running.

In addition, in the vehicle in the embodiment 1, because the regenerative braking force is applied to the rear wheels, in a case of an excess of the regenerative braking force relative to the friction braking force during the cornering, namely that when the braking force of the rear wheels is too great as compared with that of the front wheels during the cornering, the steering characteristic of the vehicle becomes an oversteer state, and cornering behavior is disrupted. Because of this, in a case where the tendency of the oversteer becomes stronger, it is required that the maximum regenerative braking force should be limited and an allocation of the braking force to the front and rear wheels during the cornering should be closer to an ideal allocation (e.g. front:rear=6:4) according to specifications of the vehicle.

A regenerative braking system that produces the regenerative braking force at the wheels (the rear left and rear right wheels RL, RR) is formed by the motor/generator MG, the inverter INV, the battery BATT and the motor control unit MCU.

The drive controller 1 inputs an accelerator opening from an accelerator opening sensor 4, the vehicle speed calculated by the wheel speed sensor 3, the battery SOC and so on, directly or through the communication line 2.

The drive controller 1 carries out an operation control of an engine ENG, an operation control of an automatic transmission (not shown) and an operation control of the motor/generator MG by the driving force command to the motor control unit MCU, on the basis of information from each sensor.

The brake control unit BCU inputs a master cylinder pressure from a master cylinder pressure sensor 5, a brake pedal stroke amount from a brake pedal stroke sensor 6, a steering angle from a steering angle sensor 7, each wheel speed from the wheel speed sensor 3, a yaw rate from a yaw rate sensor 8, each wheel cylinder pressure from a wheel cylinder pressure sensor 9, the battery SOC and so on, directly or through the communication line 2. The master cylinder pressure sensor 5 and the brake pedal stroke sensor 6 are a brake operation state detection section that detects a brake operation state of a driver.

The brake control unit BCU calculates the braking force (for each wheel) required for the braking of the vehicle on the basis of information from each sensor, and splits the required braking force between the regenerative braking force and the friction braking force, then performs an operation control of the hydraulic pressure control unit HU by the friction braking force command from the brake control unit BCU and an operation control of the motor/generator MG by the regenerative braking force command to the motor control unit MCU.

Here, in the embodiment 1, as the regenerative brake cooperative control, the regenerative braking force is used in preference to the friction braking force. As long as the required braking force can be covered by the regenerative braking force, a range of the regenerative braking is extended to the maximum (the maximum regenerative braking force) without using the friction braking force. With this, particularly in a drive pattern in which acceleration and deceleration are repeated, recovery of energy by the regenerative braking is realized up to a lower speed range, and energy-recovery efficiency becomes high.

In the case where the regenerative braking force is limited due to the decrease or the increase in the vehicle speed etc. during the regenerative braking, the brake control unit BCU decreases the regenerative braking force and increases the friction braking force by an amount of the decrease of the regenerative braking force, then secures the braking force required for the braking of the vehicle.

In the following description, an operation that decreases the regenerative braking force and increases the friction braking force is called "brake shift (or brake switch) from the regenerative braking force to the friction braking force". An operation that decreases the friction braking force and increases the regenerative braking force is called "brake shift (or brake switch) from the friction braking force to the regenerative braking force".

The brake control unit BCU directly increases the wheel cylinder pressure using hydraulic pressure generated by the driver's brake operation (i.e. the BCU performs a normal brake operation), in addition to this, the brake control unit BCU performs a control that increases or decreases or holds the wheel cylinder pressure using a discharge pressure of a pump P. With this wheel cylinder pressure control, ABS control (anti-lock brake control) can be achieved. Further, an automatic brake control that automatically increases/decreases the wheel cylinder pressure on the basis of the braking force required for various vehicle control can also be achieved.

Here, the ABS control is a control that when detecting a tendency of wheel lock during the driver's brake operation, repeats the pressure decrease, the pressure hold and the pressure increase of the wheel cylinder pressure for this wheel in order to produce the maximum braking force while preventing the wheel lock.

Further, the automatic brake control includes a vehicle motion control that when detecting that the tendency of the oversteer or the tendency of understeer becomes stronger during the cornering, ensures stabilization of a vehicle attitude by controlling the wheel cylinder W/C pressure of a certain wheel. Furthermore, a brake assist control in which a higher pressure than a pressure actually generated in the master cylinder M/C is produced at the wheel cylinder W/C upon the driver's brake operation, and a control that automatically produces the braking force in accordance with a relationship (e.g. vehicle speed, vehicle distance) with a forward-running vehicle by an auto cruise control, are included in the automatic brake control.

[Brake Circuit Configuration]

Next, the hydraulic circuit of the hydraulic pressure control unit HU will be explained on the basis of FIG. 2.

The hydraulic pressure control unit HU in the embodiment 1 has a so-called X-piping arrangement (x-pipe system) that is formed from two line pipes of a P line pipe and an S line pipe. In FIG. 2, "P" and "S" attached to the end of a reference sign indicate "P line system (P line pipe)" and "S line system (S line pipe)" respectively. FL, RR, FR and RL correspond to the front left wheel, the rear right wheel, the front right wheel and the rear left wheel respectively. In the following description, when explaining "P line system" and "S line system" and each wheel without distinction, "P" and "S" and FL, RR, FR and RL are omitted.

The hydraulic pressure control unit HU in the embodiment 1 employs a closed hydraulic circuit. Here, the closed hydraulic circuit is a hydraulic circuit in which brake fluid that is supplied to the wheel cylinder W/C is returned to a reservoir tank RSV via the master cylinder M/C.

A brake pedal BP is connected to the master cylinder M/C via an input rod IR. The input rod IR is provided with a negative pressure booster NPB that boosts an input of the input rod IR.

The P line pipe is connected to the wheel cylinder W/C (FL) of the left front (FL) wheel and the wheel cylinder W/C (RR) of the right rear (RR) wheel. The S line pipe is connected to the wheel cylinder W/C (FR) of the right front (FR) wheel and the wheel cylinder W/C (RL) of the left rear (RL) wheel. As shown in FIG. 2, a pump PP is provided in the P line pipe, and a pump PS is provided in the S line pipe. The pump PP and the pump PS are, for example, a plunger pump or a gear pump etc. These pumps PP and PS are driven by one motor M, and pressurize the brake fluid that is pumped up from an inlet section 10$a$ then discharge the brake fluid to an outlet section 10$b$.

The master cylinder M/C and the outlet section 10$b$ of the pump P are connected by pipes 11 and 31. On the pipe 11, a gate-out valve 12 of a normally-open type proportional electromagnetic valve is provided. Further, on the pipe 11, pipes 32 and 33 that bypass the gate-out valve 12 are provided.

On the pipe 32, a check valve 13 is provided. This check valve 13 allows a flow of the brake fluid in a direction from the master cylinder M/C toward the wheel cylinder W/C, and forbids a brake fluid flow of the opposite direction.

On the pipe 33, a relief valve 14 is provided. This relief valve 14 is a one-way valve that allows a flow of the brake fluid in a direction from the wheel cylinder W/C toward the master cylinder M/C, and forbids a brake fluid flow of the opposite direction. A valve opening pressure of the relief valve 14 is a predetermined pressure that exceeds a hydraulic pressure converted value of a maximum regenerative braking force limit value (an upper limit value of the maximum regenerative braking force determined by characteristic and capacity of the motor/generator MG and the inverter INV), and is set to a lower pressure than a pressure that could damage the brake circuit.

The pipe 31 is a second brake circuit that connects an after-mentioned first brake circuit (pipes 11 and 18) and the outlet section 10$b$ of the pump P. On the pipe 31, a check valve 20 is provided. The check valve 20 allows a flow of the brake fluid in a direction from the pump P toward a solenoid-in valve 19, and forbids a brake fluid flow of the opposite direction.

A pipe (a branch oil passage) 16 is provided on the pipe 11, and branches off from a point between a connection point between the pipes 11 and 31 and the gate-out valve 12. The pipe 16 connects to a fluid suction cylinder 15. The fluid suction cylinder 15 is an accumulator which has, for example, a gas spring and can store therein the brake fluid of the hydraulic pressure converted value or more of the maximum regenerative braking force limit value.

On the pipe 16, a stroke simulator valve (a switch valve) 17 of a normally-closed type electromagnetic valve is provided. Further, on the pipe 16, a pipe 34 that bypasses the stroke simulator valve 17 is provided.

On the pipe 34, a check valve 27 is provided. This check valve 27 allows a flow of the brake fluid in a direction from the fluid suction cylinder 15 toward the pipe 11, and forbids a brake fluid flow of the opposite direction.

The outlet section 10$b$ of the pump P and the wheel cylinder W/C are connected by the pipe 18. On the pipe 18, the solenoid-in valve (an inflow valve) 19 of a normally-open type proportional electromagnetic valve is provided for each wheel cylinder W/C.

On the pipe 18, a pipe 21 that bypasses the solenoid-in valve 19 is provided. On this pipe 21, a check valve 22 is provided. The check valve 22 allows a flow of the brake fluid in a direction from the wheel cylinder W/C toward the pump P, and forbids a brake fluid flow of the opposite direction.

The pipe 18 connects to the connection point between the pipes 11 and 31, and the wheel cylinder pressure sensor 9 is provided at this connection point.

The pipes 11 and 18 form the first brake circuit. The first brake circuit connects the master cylinder M/C that generates the brake fluid pressure by the driver's brake operation and the wheel cylinder W/C that is configured so that the brake fluid pressure acts on.

The wheel cylinder W/C and a reservoir 23 are connected by a pipe 24. On the pipe 24, a solenoid-out valve (an outflow valve) 25 of a normally-closed type proportional electromagnetic valve is provided.

The master cylinder M/C and the reservoir 23 are connected by a pipe 26. The pipe 26 is a third brake circuit that is on the first brake circuit (the pipes 11, 18) and connects a point positioned at a master cylinder M/C side with respect to the gate-out valve 12 and an inlet side (a pipe 30) of the pump P.

The reservoir 23 and the inlet section 10a of the pump P are connected by the pipe 30.

The pipes 24 and 30 form a fourth brake circuit. The fourth brake circuit is on the first brake circuit (the pipes 11, 18), and connects a point positioned at a wheel cylinder W/C side with respect to the solenoid-in valve 19 and the inlet section 10a of the pump P.

The reservoir 23 has a piston 23a and a gas spring (a spring member) 23b that forces the piston 23a. Further, the reservoir 23 is provided with a pressure-responsive check valve (a regulation valve or a control valve) 28 on the pipe 26.

The check valve 28 has a seat part 28a and a valve body 28b that is fixedly connected to the piston 23a. The seat part 28a is formed at an inlet portion 23c of the reservoir 23, and the valve body 28b is seated on the seat part 28a. When a predetermined amount of the brake fluid is stored in the reservoir 23, or when a pressure in the pipe 26 becomes a high pressure that exceeds a predetermined pressure, the valve body 28b is seated on the seat part 28a and closes the valve, then the check valve 28 forbids the inflow of the brake fluid into the reservoir 23. With this valve operation, application of high pressure to the inlet section 10a of the pump P is prevented.

When the pump P operates and the pressure in the pipe 30 becomes low, the valve body 28b is separated from the seat part 28a and opens the valve regardless of the pressure in the pipe 26. The check valve 28 then allows the inflow of the brake fluid into the reservoir 23.

The brake control unit BCU operates the gate-out valve 12, the solenoid-in valve 19, the solenoid-out valve 25, the stroke simulator valve 17 and the pump P in accordance with a regenerative operation state of the regenerative braking system (the motor/generator MG, the inverter INV and the battery BATT), then controls the brake fluid pressure (the hydraulic pressure).

[Regenerative Brake Cooperative Control Process]

Figure 3:
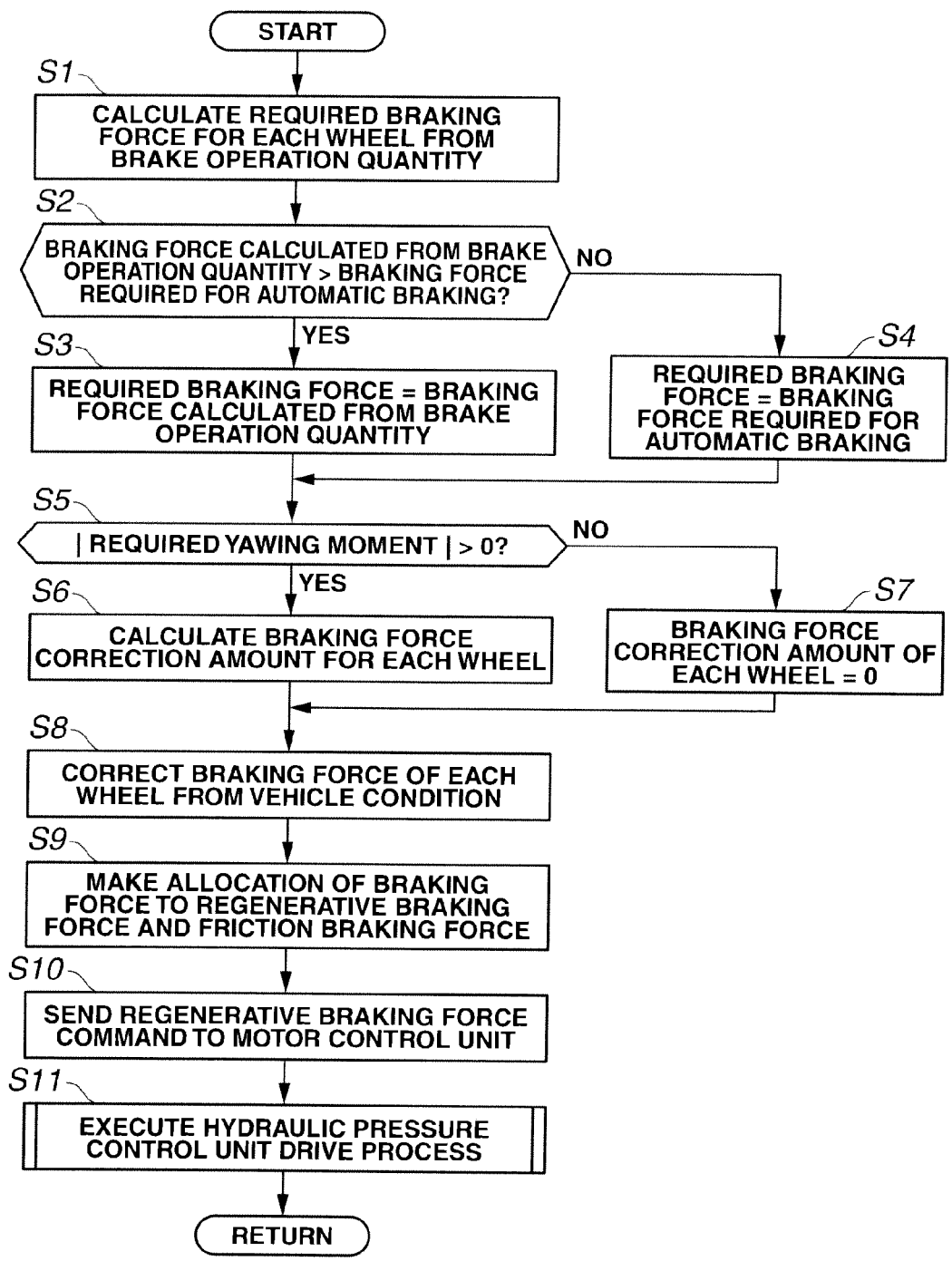
FIG. 3 is a flow chart showing a flow of a regenerative brake cooperative control process which is executed in a brake control unit BCU in the embodiment 1.

FIG. 3 is a flow chart showing a flow of a regenerative brake cooperative control process executed in the brake control unit BCU in the embodiment 1. In the following, each step will be explained. This control process is executed continually in a certain cycle.

At step S1, the brake control unit BCU calculates a braking force required for the braking of the vehicle in accordance with driver's brake operation quantity, and calculates a required braking force for each wheel. The driver's brake operation quantity is the brake pedal stroke amount from the brake pedal stroke sensor 6 or a master cylinder pressure Pmc from the master cylinder pressure sensor 5.

At step S2, a judgment is made as to whether or not the braking force calculated at step S1 is greater than a braking force required for the automatic braking, for each wheel. If YES, the routine proceeds to step S3. If NO, the routine proceeds to step S4.

At step S3, the braking force calculated at step S1 is set as the required braking force.

At step S4, the braking force required for the automatic braking is set as the required braking force.

At step S5, a judgment is made as to whether or not an absolute value of a required yawing moment is greater than zero. If YES, the routine proceeds to step S6. If NO, the routine proceeds to step S7. Here, the required yawing moment is a yawing moment of the vehicle which is necessary for obtaining a target yaw rate of the vehicle motion control. The required yawing moment is calculated, for instance, on the basis of a difference between an actual yaw rate detected by the yaw rate sensor 8 and the target yaw rate.

At step S6, the brake control unit BCU calculates a braking force correction amount for each wheel to obtain the required yawing moment with a deceleration being constant, and corrects the braking force of each wheel.

At step S7, the braking force correction amount of each wheel is set to zero.

At step S8, the brake control unit BCU corrects the braking force of each wheel on the basis of a vehicle condition. As an example, in a case where an intervention of the ABS control is made, the brake control unit BCU decreases the braking force.

At step S9, the brake control unit BCU makes the allocation of the braking force of the rear left and right wheels RL, RR to the regenerative braking force and the friction braking force, and produces the regenerative braking force command and the friction braking force command. At this time, the regenerative braking force is set to the maximum regenerative braking force received from the motor control unit MCU.

At step S10, the brake control unit BCU sends the regenerative braking force command produced at step S9 to the motor control unit MCU.

At step S11, the brake control unit BCU carries out a hydraulic pressure control unit drive process that drives the hydraulic pressure control unit HU on the basis of the friction braking force command of each wheel produced at step S9.

That is to say, in the regenerative brake cooperative control in the embodiment 1, the driver's required braking force and the braking force required for the automatic brake control are compared for each wheel. Then the braking force that is greater is set as the braking force required for the braking of the vehicle. Subsequently, this set braking force of each wheel is corrected according to the yawing moment during the cornering and the vehicle condition (e.g. the ABS control intervention). And, the brake control unit BCU makes the allocation of the braking force of the rear left and right wheels RL, RR to the regenerative braking force and the friction braking force, and outputs the regenerative braking force command to the motor control unit MCU also outputs the friction braking force command to the hydraulic pressure control unit HU.

[Hydraulic Pressure Control Unit Drive Process]

Figure 4:
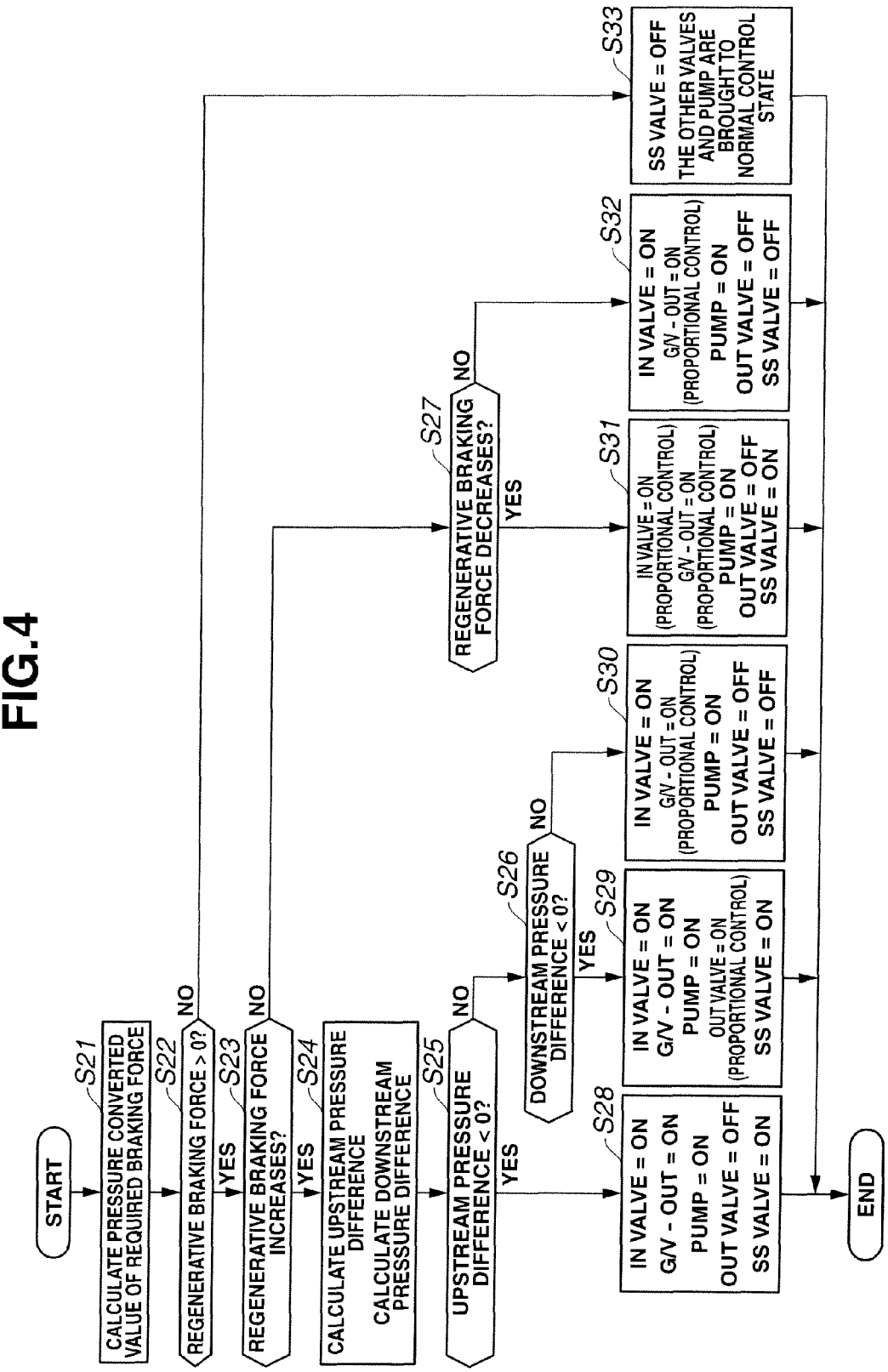
FIG. 4 is a flow chart showing a flow of a hydraulic pressure control unit drive process which is executed at step S11 in FIG. 3.

FIG. 4 is a flow chart showing a flow of a hydraulic pressure control unit drive process which is executed at step S11 in FIG. 3. In the following description, each step will be explained.

At step S21, the brake control unit BCU calculates a pressure converted value of the friction braking force command of each wheel calculated at step S9, namely that the brake control unit BCU calculates a target wheel cylinder pressure Pwc* of each wheel cylinder W/C and a target master cylinder pressure Pmc*. The target wheel cylinder pressure Pwc* is calculated by subtracting a hydraulic pressure converted value Prg of the regenerative braking force from the target master cylinder pressure Pmc*. The target master cylinder pressure Pmc* is set on the basis of the master cylinder pressure and the brake pedal stroke amount so as to obtain a brake pedal characteristic (a relationship between a brake pedal depression force, a brake pedal stroke amount and a vehicle deceleration) of the normal braking.

At step S22, a judgment is made as to whether or not the regenerative braking force is greater than zero. If YES, the routine proceeds to step S23. If NO, the routine proceeds to step S33.

At step S23, a judgment is made as to whether or not the regenerative braking force increases. If YES, the routine proceeds to step S24. If NO, the routine proceeds to step S27.

At step S24, the brake control unit BCU calculates an upstream pressure difference and a downstream pressure difference. The upstream pressure difference is a value determined by subtracting the actual master cylinder pressure Pmc detected by the master cylinder pressure sensor 5 from the target wheel cylinder pressure Pwc* calculated at step S21. The downstream pressure difference is a value determined by subtracting an actual wheel cylinder pressure Pwc from the target wheel cylinder pressure Pwc*.

At step S25, a judgment is made as to whether or not the upstream pressure difference (Pwc*−Pmc) calculated at step S24 is less than zero. If YES, the routine proceeds to step S28. If NO, the routine proceeds to step S26.

At step S26, a judgment is made as to whether or not the downstream pressure difference (Pwc*−Pwc) calculated at step S24 is less than zero. If YES, the routine proceeds to step S29. If NO, the routine proceeds to step S30.

At step S27, a judgment is made as to whether or not the regenerative braking force decreases. If YES, the routine proceeds to step S31. If NO, the routine proceeds to step S32.

At step S28, the control is shifted to "stroke simulator operation mode" in which the brake control unit BCU closes the solenoid-in valve (IN valve) 19, the gate-out valve (G/V-OUT) 12 and the solenoid-out valve (OUT valve) 25, and opens the stroke simulator valve (SS valve) 17, and operates the motor M of the pump P. A rotation speed of the motor M is set according to the target master cylinder pressure Pmc*.

The stroke simulator operation mode corresponds to a brake fluid storing step in which the brake fluid flowing out from the master cylinder M/C by the driver's brake operation is stored in the fluid suction cylinder 15 by operating the pump P provided in the brake circuit when the regenerative braking system works or is in action.

At step S29, the control is shifted to "reservoir pressure decrease→stroke simulator operation mode" in which the brake control unit BCU closes the solenoid-in valve (IN valve) 19 and the gate-out valve (G/V-OUT) 12, and performs a proportional control of the solenoid-out valve (OUT valve) 25, and opens the stroke simulator valve (SS valve) 17, and operates the motor M of the pump P. Here, an opening of the solenoid-out valve (OUT valve) 25 is set according to the target wheel cylinder pressure Pwc*. Further, the rotation speed of the motor M is set according to the target master cylinder pressure Pmc*.

The reservoir pressure decrease→stroke simulator operation mode corresponds to a brake fluid discharging step in which when the regenerative braking force of the regenerative braking system lowers, the brake fluid stored in the fluid suction cylinder 15 flows into the wheel cylinder W/C provided at the wheel.

At step S30, the control is shifted to "standby mode" in which the brake control unit BCU performs a proportional control of the gate-out valve (G/V-OUT) 12, and closes the solenoid-in valve (IN valve) 19, the solenoid-out valve (OUT valve) 25 and the stroke simulator valve (SS valve) 17, and operates the motor M of the pump P. Here, an opening of the gate-out valve (G/V-OUT) 12 is set according to the target master cylinder pressure Pmc*. Further, the rotation speed of the motor M is set to a predetermined minimum rotation speed.

At step S31, the control is shifted to "pressure increase mode" in which the brake control unit BCU performs proportional controls of the solenoid-in valve (IN valve) 19 and the gate-out valve (G/V-OUT) 12, and closes the solenoid-out valve (OUT valve) 25, and opens the stroke simulator valve (SS valve) 17, and operates the motor M of the pump P. Here, an opening of the solenoid-in valve (IN valve) 19 is set according to the target wheel cylinder pressure Pwc*. The opening of the gate-out valve (G/V-OUT) 12 is set according to the target master cylinder pressure Pmc*. Further, the rotation speed of the motor M is set to the predetermined minimum rotation speed.

The pressure increase mode corresponds to the brake fluid discharging step in which when the regenerative braking force of the regenerative braking system lowers, the brake fluid stored in the fluid suction cylinder 15 flows into the wheel cylinder W/C provided at the wheel.

At step S32, the control is shifted to "standby mode" in which the brake control unit BCU performs the proportional control of the gate-out valve (G/V-OUT) 12, and closes the solenoid-in valve (IN valve) 19, the solenoid-out valve (OUT valve) 25 and the stroke simulator valve (SS valve) 17, and operates the motor M of the pump P. Here, the opening of the gate-out valve (G/V-OUT) 12 is set according to the target master cylinder pressure Pmc*. Further, the rotation speed of the motor M is set to the predetermined minimum rotation speed.

At step S33, the control is shifted to "non-regenerative brake cooperative mode". In this mode, the brake control unit BCU closes the stroke simulator valve (SS valve) 17, and the other valves 12, 19 and 25 and the pump P are brought to a state of the normal control (in the case of the normal braking, this state is a non-power application state shown in FIG. 2, and in the case of the automatic brake control, this state is a power application/non-power application state according to the automatic control).

Next, the operation will be explained.

[Regenerative Brake Cooperative Operation]

Figure 5:
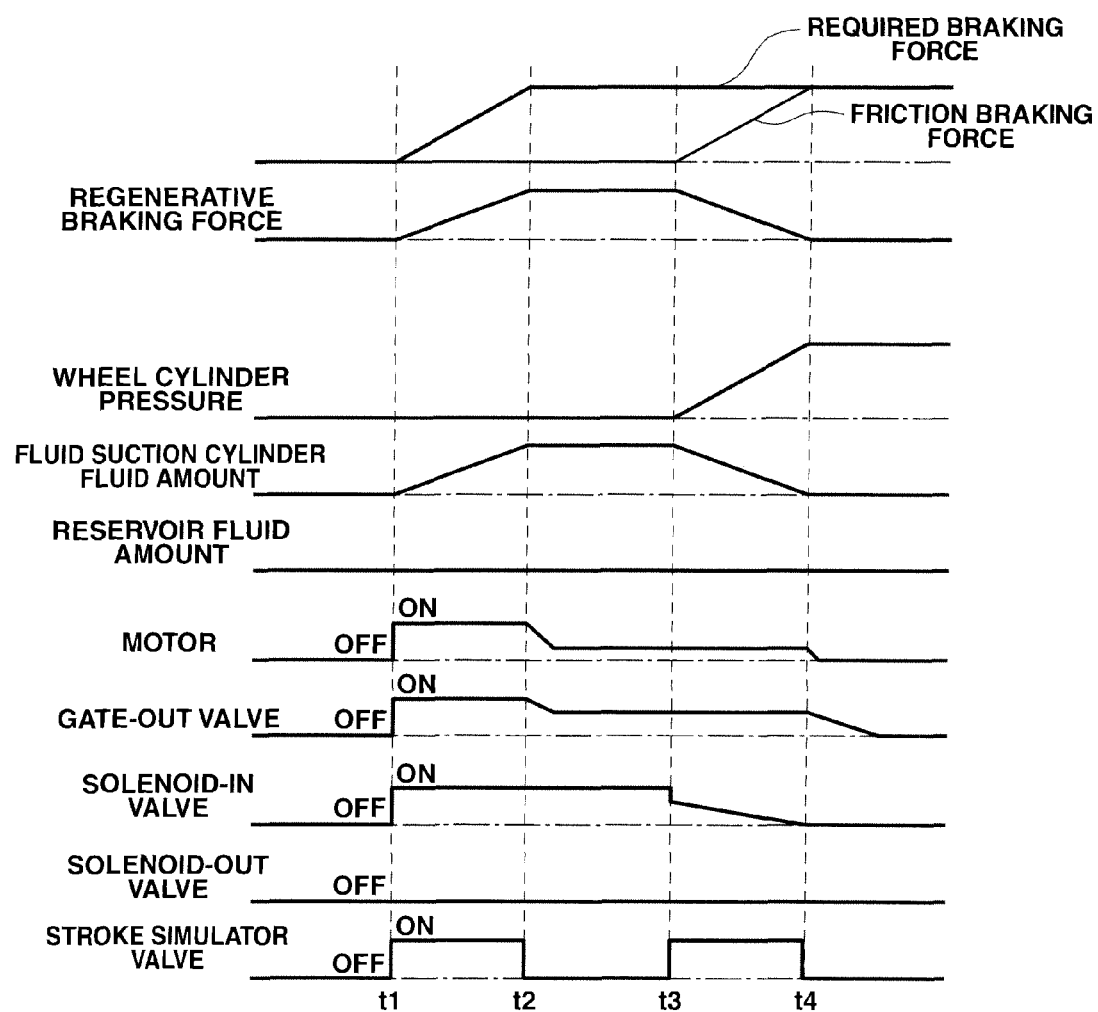
FIG. 5 is a time chart of a case where a regenerative braking force is produced from the beginning of the braking.

FIG. 5 is a time chart of a case where a regenerative braking force is produced from the beginning of the braking.

At time t1, the driver starts depression of the brake pedal BP. During a period from time t1 to time t2, by further depression of the brake pedal BP by the driver, the master cylinder pressure Pmc is increased. At this time, the stroke simulator operation mode is set in the hydraulic pressure control unit drive process, and the solenoid-in valve (IN valve) 19, the gate-out valve (G/V-OUT) 12 and the solenoid-out valve (OUT valve) 25 are closed, the stroke simulator valve (SS valve) 17 is opened, and the pump P is operated (S21→S22→S23→S24→S25→S28).

By closing the gate-out valve (G/V-OUT) 12 and the solenoid-in valve (IN valve) 19, the flowing-out of the brake fluid from the master cylinder M/C to the wheel cylinder W/C is restrained, and the increase in the friction braking force can be prevented. The driver's required braking force is thus produced only by the regenerative braking force, and an energy recovery efficiency can be increased. Also, by opening the stroke simulator valve (SS valve) 17 and operating the pump P so as to be able to obtain the target master cylinder pressure Pmc*, the brake fluid flowing into the hydraulic pressure control unit HU from the master cylinder M/C according to the driver's brake operation is released to a discharge side (the outlet section side) of the pump P, then good pedal feel same as the brake pedal characteristic of the normal braking can be obtained.

At time t2, since a depression amount of the brake pedal BP by the driver is constant, the standby mode is executed during a period from time t2 to time t3. That is, the stroke simulator valve (SS valve) 17 is closed, and the rotation speed of the motor M is reduced up to the minimum rotation speed, also the proportional control of the gate-out valve (G/V-OUT) 12 is performed (S21→S22→S23→S27→S32).

Here, the reason why the motor M is not stopped in the standby mode is because response of the motor M is ensured when shifting from the standby mode to the stroke simulator operation mode or to the reservoir pressure decrease→stroke simulator operation mode.

In this operation, since the pipes 11 and 16 etc. become a high pressure state by the discharge pressure of the pump P because of the closure of the stroke simulator valve (SS valve) 17, by performing the proportional control of the gate-out valve (G/V-OUT) 12 so as not to change the pedal feel, a part of the brake fluid leaks to the master cylinder M/C side.

At time t3, since the maximum regenerative braking force reduces with the decrease in the vehicle speed, the regenerative braking force of the rear wheel reduces. Thus, the pressure increase mode is set during a period from time t3 to time t4, and the stroke simulator valve (SS valve) 17 is opened, and the proportional control of the solenoid-in valve (IN valve) 19 is performed so that the friction braking force rises up or increases with the reduction of the regenerative braking force (S21→S22→S23→S27→S31). With this operation, the brake fluid stored in the fluid suction cylinder 15 is supplied to the wheel cylinder W/C, and the required braking force can be secured by this brake shift from the regenerative braking force to the friction braking force.

Here, as mentioned above, the brake fluid stored in the fluid suction cylinder 15 has the pressure of the hydraulic pressure converted value or more of the maximum regenerative braking force limit value. Therefore, the fluid suction cylinder 15 functions as the accumulator, and the friction braking force rises up immediately, thereby suppressing lack of braking force upon the brake shift from the regenerative braking force to the friction braking force.

At time t4, since the regenerative braking force becomes zero, the non-regenerative brake cooperative mode is set after the time t4, and the motor M is stopped, the solenoid-in valve (IN valve) 19 is opened, and the stroke simulator valve (SS valve) 17 is closed. At this time, by gradually opening the gate-out valve (G/V-OUT) 12, the master cylinder pressure Pmc and the wheel cylinder pressure Pwc match or agree with each other.

Figure 6:
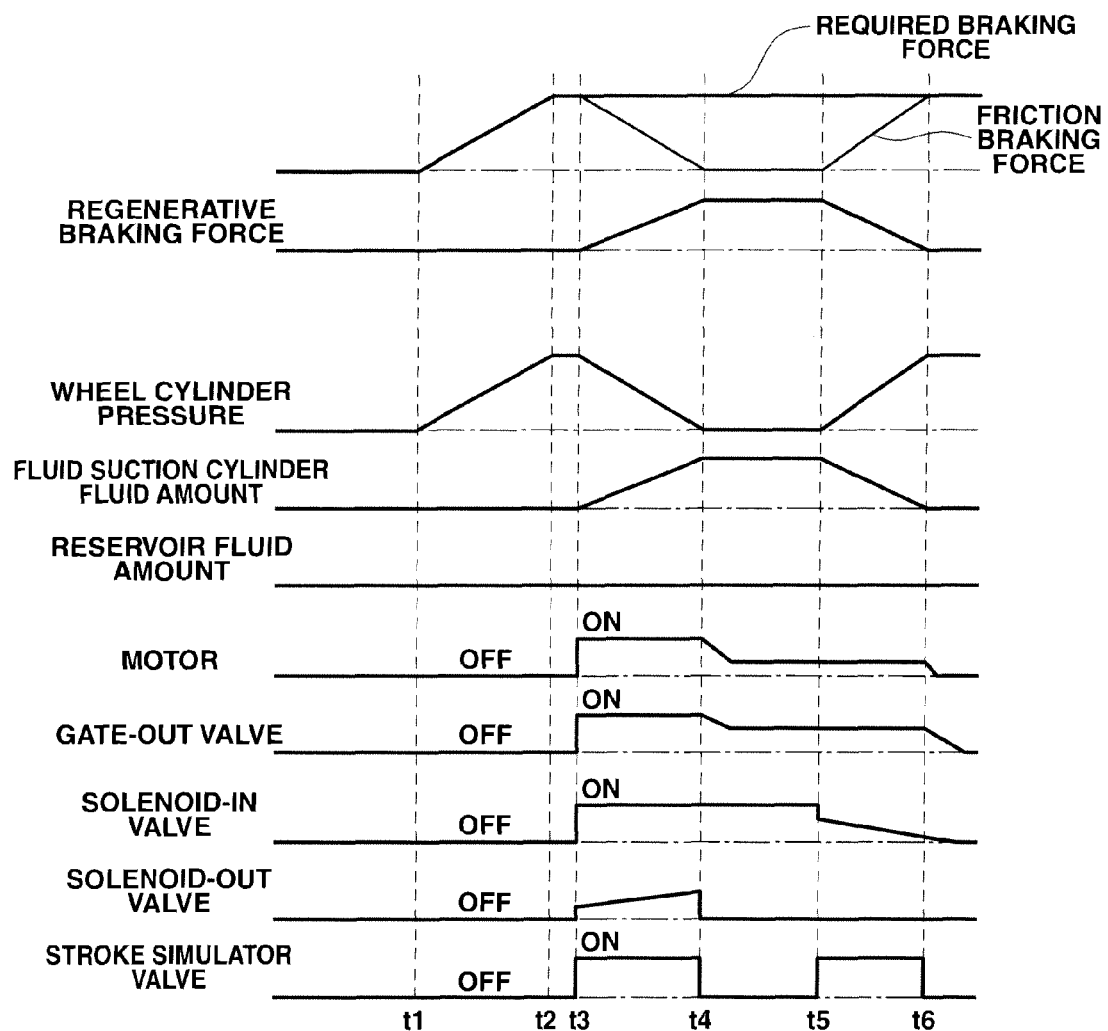
FIG. 6 is a time chart of a case where deceleration is carried out from a high vehicle speed range to an extremely low vehicle speed range or to a vehicle stop.

FIG. 6 is a time chart of a case where deceleration is carried out from a high vehicle speed range to an extremely low vehicle speed range or to a vehicle stop. As a precondition, when the vehicle speed is in the high vehicle speed range or in the extremely low vehicle speed range, the regenerative braking is forbidden.

At time t1, the driver starts depression of the brake pedal BP. Since the vehicle speed is in the high vehicle speed range in which the regenerative braking is forbidden during a period from time t1 to time t2, the wheel cylinder pressure is increased by the brake fluid supplied from the master cylinder M/C to the wheel cylinder W/C.

At time t3, since the vehicle decelerates up to a vehicle speed range in which the regenerative braking is permitted, the regenerative braking force gradually increases during a period from time t3 to time t4. At this time, the reservoir pressure decrease→stroke simulator operation mode is set in the hydraulic pressure control unit drive process, and the solenoid-in valve (IN valve) 19 and the gate-out valve (G/V-OUT) 12 are closed, the proportional control of the solenoid-out valve (OUT valve) 25 is performed, the stroke simulator valve (SS valve) 17 is opened, and the pump P is operated (S21→S22→S23→S24→S25→S26→S29). With this operation, the brake fluid flowing out from the wheel cylinder W/C to the reservoir 23 is pumped up by the pump P then is stored in the fluid suction cylinder 15, and the brake shift from the friction braking force to the regenerative braking force can be achieved while securing the good pedal feel same as the brake pedal characteristic of the normal braking.

At time t4, since the brake shift from the friction braking force to the regenerative braking force is completed, the standby mode is executed during a period from time t4 to time t5.

At time t5, since the vehicle speed gets close to the extremely low vehicle speed range in which the regenerative braking is forbidden, the pressure increase mode is set during a period from time t5 to time t6.

At time t6, since the regenerative braking force becomes zero, the non-regenerative brake cooperative mode is set after the time t6.

Figure 7:
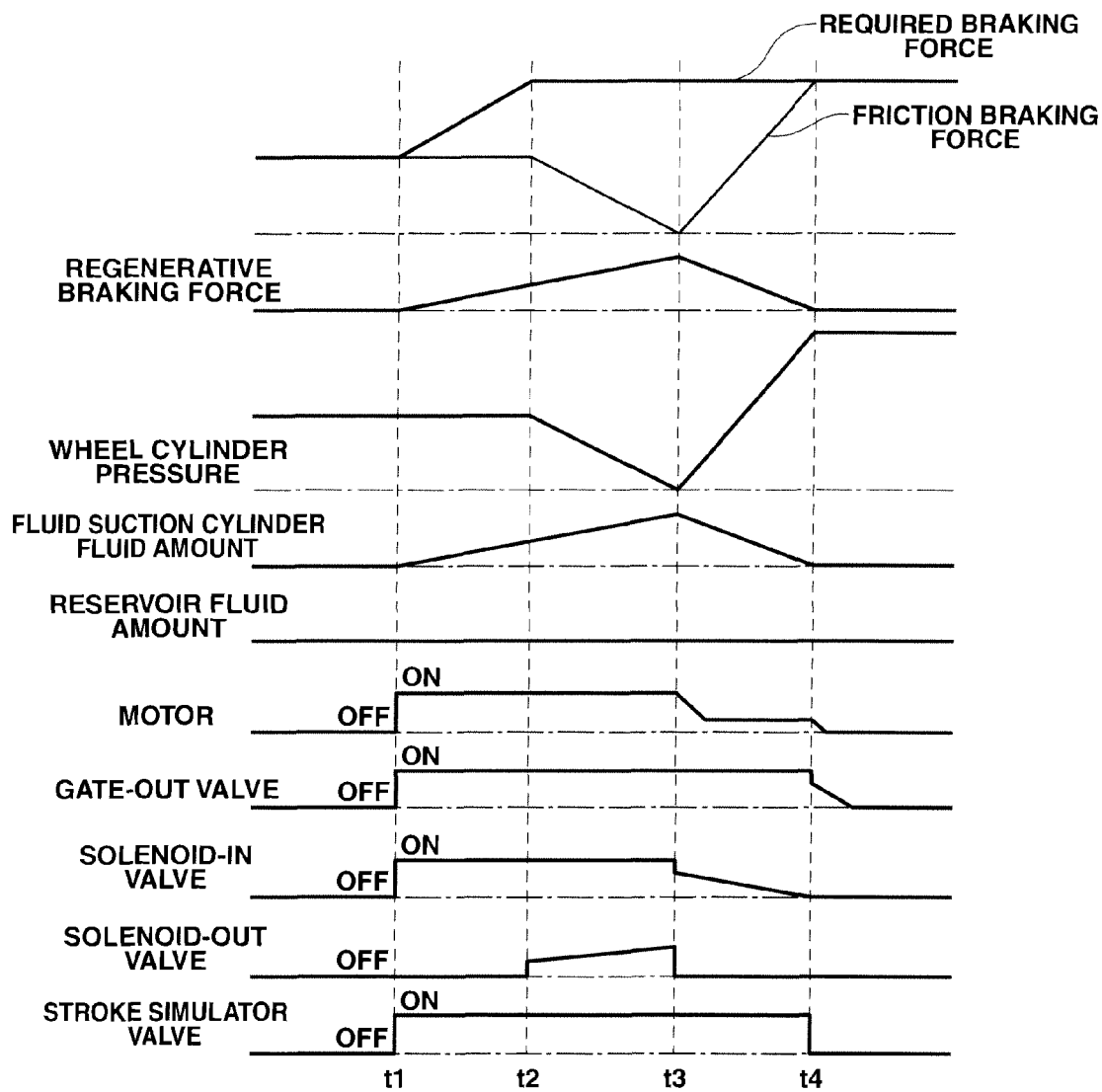
FIG. 7 is a time chart of a case where a further depression of a brake pedal BP is done by a driver during the deceleration from the high vehicle speed range.

FIG. 7 is a time chart of a case where a further depression of the brake pedal BP is done by the driver during the deceleration from the high vehicle speed range. As a precondition, when the vehicle speed is in the high vehicle speed range or in the extremely low vehicle speed range, the regenerative braking is forbidden.

At time t1, since the driver starts the further depression of the brake pedal BP and the vehicle simultaneously decelerates up to the vehicle speed range in which the regenerative braking is permitted, the stroke simulator operation mode is set during a period from time t1 to time t2.

At time t2, although the depression amount of the brake pedal BP by the driver is constant, the regenerative braking force does not reach the maximum regenerative braking force yet. Therefore, during a period from time t2 to time t3, the reservoir pressure decrease→stroke simulator operation mode is set.

Here, if the brake shift from the friction braking force to the regenerative braking force is carried out by opening the solenoid-out valve (OUT valve) 25 from time t1, the brake fluid flowing out from the wheel cylinder W/C flows into the reservoir 23. And when the brake fluid fills the reservoir 23, since the pump P is not able to pump up the brake fluid from the master cylinder M/C side, the brake pedal BP does not move forward, then rigid pedal feel (a stiff brake pedal state in which there is no brake pedal stroke even though the brake pedal is depressed) occurs.

Thus, in the case where the increase in the regenerative braking force and the further depression of the brake pedal BP occur at the same time, the mode shifts to the stroke simulator operation mode once, then after completion of the further depression of the brake pedal BP, the mode shifts to the reservoir pressure decrease→stroke simulator operation mode. That is, in the case where the further depression of the brake pedal BP is done, generation of the pedal feel takes preference over the brake shift from the friction braking force to the regenerative braking force. Then by delaying the pressure decrease of the wheel cylinder W/C until a predetermined time (t1~t2) at which the further depression of the brake pedal BP is completed elapses, deterioration in the pedal feel, caused by the occurrence of the rigid pedal feel, can be suppressed.

At time t3, since the vehicle speed gets close to the extremely low vehicle speed range in which the regenerative braking is forbidden, the pressure increase mode is set during a period from time t3 to time t4.

At time t4, since the regenerative braking force becomes zero, the non-regenerative brake cooperative mode is set after the time t4.

[Influence in Improvement in Pedal Feel]

In the brake control apparatus in JP2006-159949, the stroke simulator is provided in a brake circuit, and during the automatic braking or the regenerative braking, the brake fluid flowing out from the master cylinder is sucked or absorbed into the stroke simulator, thereby generating pedal feel.

However, in the related art brake control apparatus of JP2006-159949, the stroke simulator is connected at a midpoint of an oil passage that connects an inlet side of a pump and the master cylinder. Because of this, upon the brake shift from the regenerative braking force to the friction braking force, when the brake fluid stored in the stroke simulator is supplied to a wheel cylinder by operating the pump, there is a risk that the brake fluid stored in the stroke simulator is not fully discharged then the brake fluid in the master cylinder is pumped up by the pump. In this case, since the brake pedal characteristic changes, there is a possibility that the deterioration in the pedal feel will occur.

In contrast to this, in the brake control apparatus of the embodiment 1, the fluid suction cylinder 15 and a point positioned at the wheel cylinder W/C side with respect to the gate-out valve 12 on the pipe 11 are connected by the pipe 16, and the stroke simulator valve 17 is provided on the pipe 16. Therefore, when not increasing the pressure of the wheel cylinder W/C upon the execution of the regenerative brake cooperative control, by closing the gate-out valve 12 and the solenoid-in valve 19 and opening the stroke simulator valve 17 and operating the pump P, the brake fluid flowing out from the master cylinder M/C according to the driver's brake operation is pumped up by the pump P and is stored in the fluid suction cylinder 15, thereby realizing a predetermined or desired brake pedal characteristic and bringing about the improvement in the pedal feel.

In addition, when performing the brake shift from the regenerative braking force to the friction braking force, by opening the solenoid-in valve 19, the pressure increase of the wheel cylinder W/C can be achieved using the high pressure brake fluid stored in the fluid suction cylinder 15. At this time, since the fluid suction cylinder 15 is connected at the discharge side (the outlet section side) of the pump P (i.e. at the wheel cylinder W/C side with respect to the gate-out valve 12 on the pipe 11), it is possible to immediately increase the pressure of the wheel cylinder W/C without the need to pump up the brake fluid stored in the fluid suction cylinder 15 by the pump P. Further, since the fluid suction cylinder 15 is intercepted or isolated from the master cylinder M/C and the brake pedal characteristic is generated by the pump P, the above-mentioned brake pedal characteristic change, which could arise in the related art brake control apparatus, does not occur.

[Function of Relief Valve]

In the embodiment 1, when storing the brake fluid in the fluid suction cylinder 15, since the gate-out valve 12 and the solenoid-in valve 19 are closed then the pump P is operated, internal pressure of the pipes 11 and 16 becomes high by the discharge pressure of the pump P.

Thus in the embodiment 1, by providing the relief valve 14 on the pipe 33 bypassing the gate-out valve 12, the brake fluid can be released to the master cylinder M/C side before the internal pressure of the pipes 11 and 16 excessively increases. The brake circuit can be protected by this brake fluid release.

Next, effects will be explained. The brake control apparatus of the embodiment 1 has the following effects.

(1) The brake control apparatus used for the vehicle having the regenerative braking system (the motor/generator MG, the inverter INV, the battery BATT and the motor control unit MCU), has: the pump P provided in the brake circuit; the first brake circuit 11, 18 connecting the master cylinder M/C that generates the brake fluid pressure by driver's brake operation and the wheel cylinder W/C that is configured so that the brake fluid pressure acts on; the second brake circuit 31 connecting the first brake circuit 11, 18 and the outlet side (the outlet section 10b) of the pump P; the gate-out valve 12 provided at the master cylinder M/C side with respect to the connection point of the second brake circuit 31, on the first brake circuit 11, 18; the third brake circuit 26 connecting the point positioned at the master cylinder M/C side with respect to the gate-out valve 12 and the inlet side (the inlet section 10a) of the pump P, on the first brake circuit 11, 18; the inflow valve (the solenoid-in valve) 19 provided at the wheel cylinder W/C side with respect to the connection point of the second brake circuit 31, on the first brake circuit 11, 18; the fourth brake circuit 24, 30 connecting the point positioned at the wheel cylinder W/C side with respect to the solenoid-in valve 19 and the inlet side 10a of the pump P, on the first brake circuit 11, 18; the outflow valve (the solenoid-out valve) 25 provided on the fourth brake circuit 24, 30; the reservoir 23 provided, on the fourth brake circuit 24, 30, at the inlet side 10a of the pump P with respect to the solenoid-out valve 25 and connecting to the third brake circuit 26; the fluid suction cylinder 15 into which the brake fluid can flow; the branch oil passage (the pipe) 16 branching off from the point between the connection point of the second brake circuit 31 and the gate-out valve 12 on the first brake circuit 11, 18 and connecting to the fluid suction cylinder 15; the switch valve (the stroke simulator valve) 17 provided on the branch oil passage 16; the regulation valve (the check valve) 28 provided on the third brake circuit 26 and regulating the amount of the brake fluid that flows into the reservoir 23 from the master cylinder M/C; and the hydraulic pressure control unit BCU controlling the brake fluid pressure by operating the gate-out valve 12, the solenoid-in valve 19, the solenoid-out valve 25, the stroke simulator valve 17 and the pump P in accordance with the regenerative operation state of the regenerative braking system.

With this, it is possible to improve the pedal feel upon the execution of the regenerative brake cooperative control.

(2) The brake control apparatus further has: the brake operation state detection section (the master cylinder pressure sensor 5 and the brake pedal stroke sensor 6) detecting the brake operation state of the driver, and when the brake operation is detected by the brake operation state detection section 5, 6 and the regenerative braking system works, the hydraulic pressure control unit (BCU) pours the brake fluid that flows out from the master cylinder M/C into the fluid suction cylinder 15 by operating the gate-out valve 12 and the solenoid-in valve 19 in the valve closing direction, operating the simulator valve 17 in the valve opening direction and operating the pump P.

By closing the gate-out valve 12 and the solenoid-in valve 19, the flowing-out of the brake fluid from the master cylinder M/C to the wheel cylinder W/C is restrained, and the increase in the friction braking force can be prevented. The driver's required braking force is thus produced only by the regenerative braking force, and an energy recovery efficiency can be increased. Also, by opening the stroke simulator valve 17 and operating the pump P, the brake fluid flowing into the hydraulic pressure control unit HU from the master cylinder M/C according to the driver's brake operation is released to the discharge side (the outlet section side) of the pump P, then good pedal feel same as the brake pedal characteristic of the normal braking can be obtained.

(3) In the brake control apparatus, when the regenerative braking force of the regenerative braking system lowers, the hydraulic pressure control unit BCU operates the solenoid-in valve 19 in the valve opening direction according to the lowering of the regenerative braking amount and supplies the brake fluid pouring into the fluid suction cylinder 15 to the wheel cylinder W/C.

By operating the solenoid-in valve 19 in the valve opening direction, it is possible to immediately increase the wheel cylinder pressure using the high pressure brake fluid stored in the fluid suction cylinder 15, and the required braking force can be secured by the brake shift from the regenerative braking force to the friction braking force.

(4) In the brake control apparatus, when the regenerative braking system works while the brake fluid pressure generated by the driver's brake operation acts on the wheel cylinder W/C, the hydraulic pressure control unit BCU operates the gate-out valve 12 and the solenoid-in valve 19 in the valve closing direction, operates the solenoid-out valve 25 and the stroke simulator valve 17 in the valve opening direction and operates the pump P.

By operating the solenoid-out valve 25 in the valve opening direction, the brake fluid flowing out from the wheel cylinder W/C to the reservoir 23 is pumped up by the pump P then is stored in the fluid suction cylinder 15, and the brake shift from the friction braking force to the regenerative braking force can be achieved. Further, by opening the stroke simulator valve 17 and operating the pump P, the brake fluid flowing into the hydraulic pressure control unit HU from the master cylinder M/C according to the driver's brake operation is released to the discharge side (the outlet section side) of the pump P, then good pedal feel same as the brake pedal characteristic of the normal braking can be obtained.

(5) In the brake control apparatus, when the regenerative braking system works also the increase in the driver's brake operation amount is detected by the brake operation state detection section 5, 6 while the brake fluid pressure generated by the driver's brake operation acts on the wheel cylinder W/C, the hydraulic pressure control unit BCU operates the solenoid-out valve 25 in the valve closing direction.

By operating the solenoid-out valve 25 in the valve closing direction, the inflow of the brake fluid from the wheel cylinder W/C to the reservoir 23 can be restrained, then the occurrence of the rigid pedal feel, which is caused by the fact that the pump P can not pump up the brake fluid from the master cylinder M/C side, can be suppressed.

[Embodiment 2]

Figure 8:
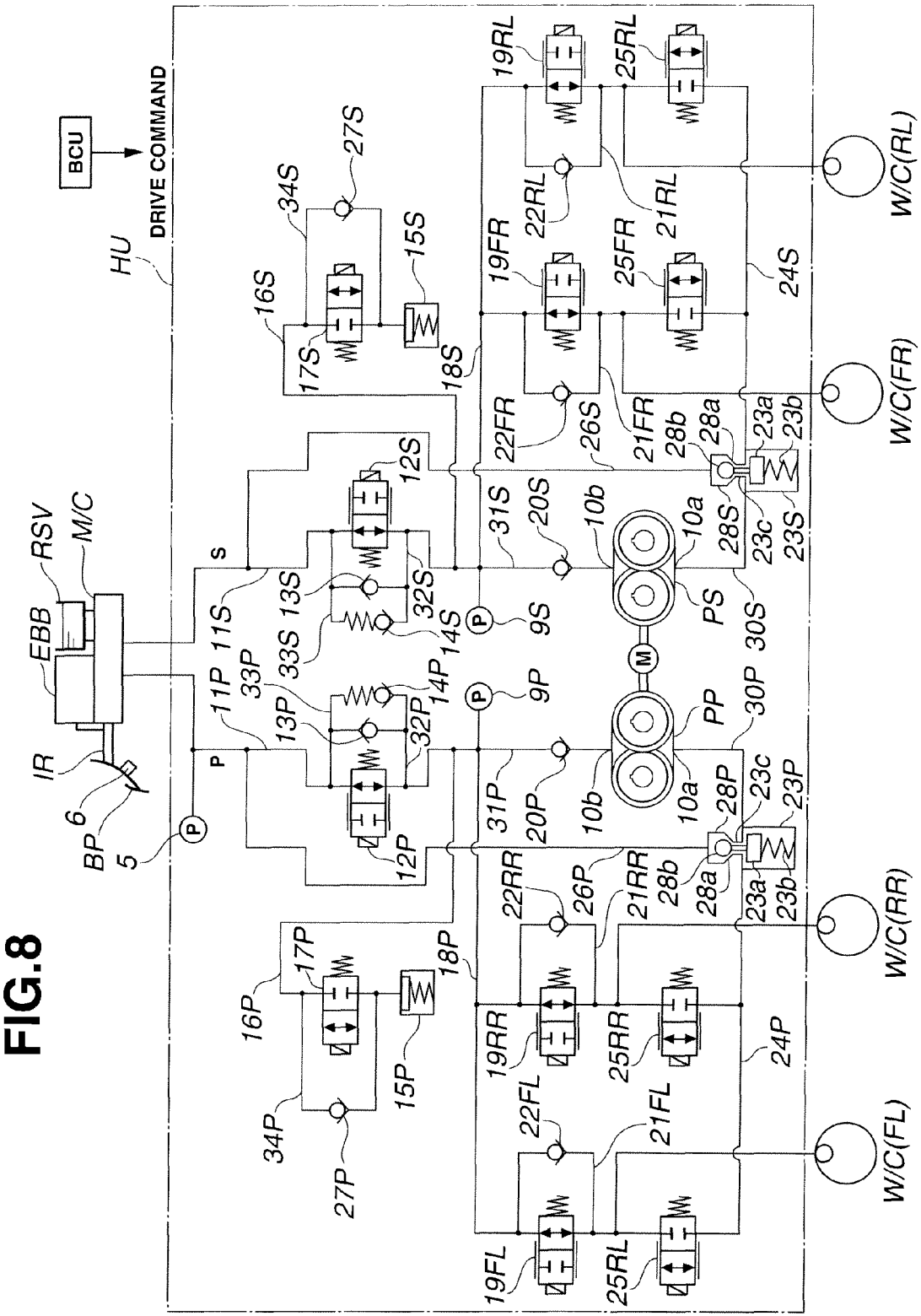
FIG. 8 is a hydraulic circuit of a brake control apparatus of an embodiment 2.

FIG. 8 is a hydraulic circuit of a brake control apparatus of an embodiment 2.

A hydraulic pressure control unit HU of the embodiment 2 is provided with an electric booster EBB instead of the negative pressure booster NPB shown in FIG. 2. The electric booster EBB is a booster that produces a brake pressure in the master cylinder M/C by moving a booster rod (not shown) arranged parallel to the input rod IR by an electric motor in accordance with a stroke amount of the input rod IR.

[ABS Control Process]

Operation of each mode in the ABS control by the brake control unit (an anti-lock brake control section) BCU of the embodiment 2 will be explained below.

In a pressure decrease mode, the solenoid-in valve 19 is closed, the solenoid-out valve 25 and the stroke simulator valve 17 are opened, and the pump P is operated.

In a holding mode, the solenoid-in valve 19, the solenoid-out valve 25 and the stroke simulator valve 17 are closed, and the pump P is operated.

In a pressure increase mode, the proportional control of the solenoid-in valve 19 is performed, the stroke simulator valve 17 is opened, the solenoid-out valve 25 is closed, and the pump P is operated.

Here, in a case where the regenerative braking force is produced when an ABS control operation flag is set, first the brake shift from the regenerative braking force to the friction braking force is carried out as the stroke simulator operation mode of the regenerative brake cooperative control, then the mode shifts to each mode of the above ABS control.

Next, the operation will be explained.

[Improvement in Pressure Increase Response in ABS Control]

Figure 9:
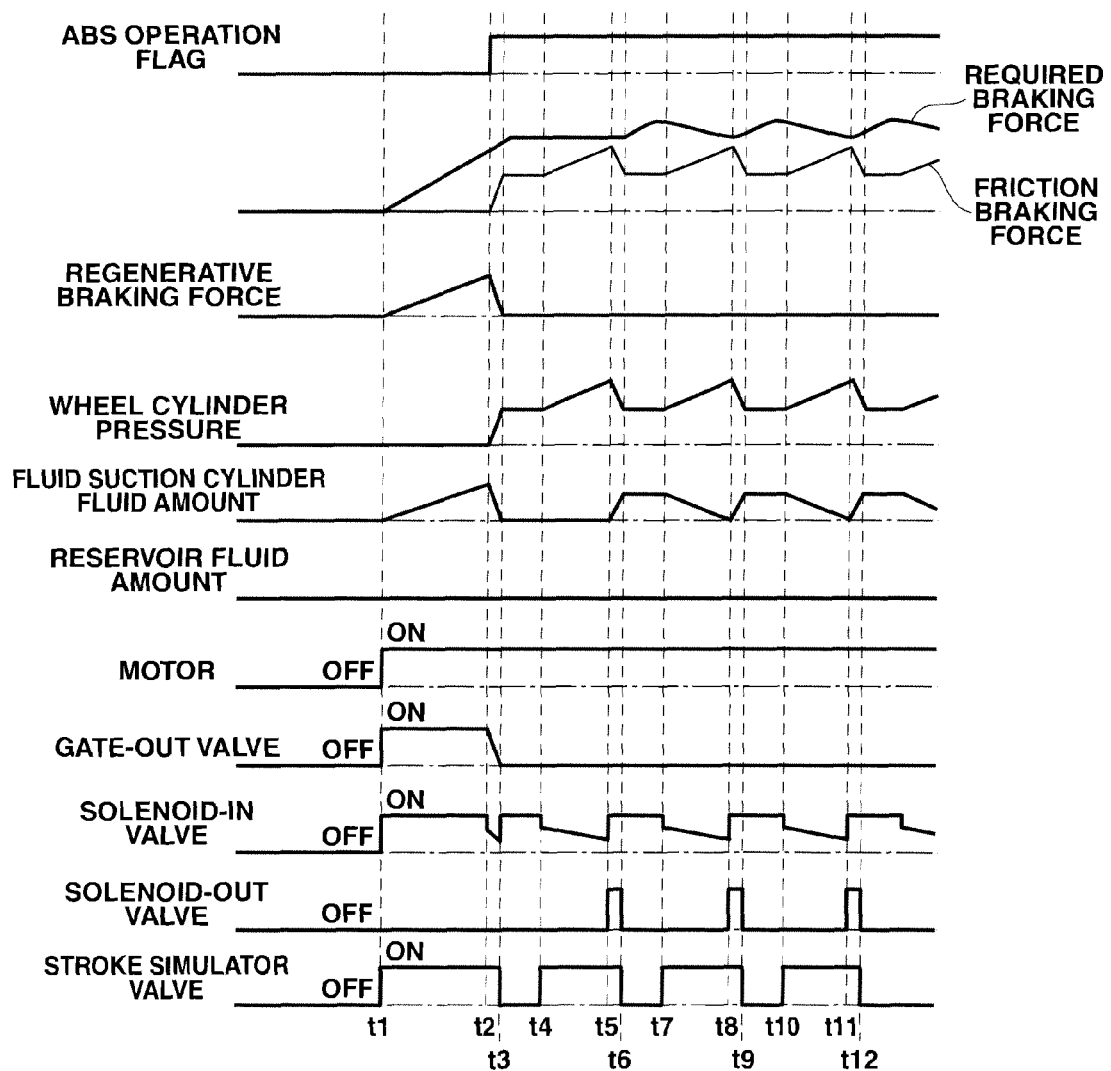
FIG. 9 is a time chart showing operation of each of valves 12, 17, 19 and 25 and a motor M upon execution of an ABS control.

FIG. 9 is a time chart showing operation of each of the valves 12, 17, 19 and 25 and the motor M upon execution of the ABS control.

At time t1, the driver starts depression of the brake pedal BP, and the stroke simulator operation mode is set during a period from time t1 to time t2.

At time t2, since the ABS operation flag is set, the brake shift from the regenerative braking force to the friction braking force is carried out during a period from time t2 to time t3. At this time, the proportional controls of the gate-out valve 12 and the solenoid-in valve 19 are performed.

At time t3, since the brake shift from the regenerative braking force to the friction braking force is completed and the ABS control is the holding mode, the gate-out valve 12 is opened, and the stroke simulator valve 17 and the solenoid-in valve 19 are closed during a period from time t3 to time t4.

At time t4, since the mode shifts from the holding mode to the pressure increase mode, the stroke simulator valve 17 is opened, and the proportional control of the solenoid-in valve 19 is performed during a period from time t4 to time t5.

At time t5, since the mode shifts from the pressure increase mode to the pressure decrease mode, during a period from time t5 to time t6, by closing the solenoid-in valve 19 and opening the solenoid-out valve 25, the brake fluid flowing out from the wheel cylinder W/C to the reservoir 23 is returned to the master cylinder M/C side.

At this time, a part of the brake fluid discharged from the pump P is stored in the fluid suction cylinder 15 through the pipe 16 connecting to the pipe 11 without returning to the master cylinder M/C side.

In general, in a case where the electric booster is used as the booster, because response of an actuator with respect to the return of the brake fluid is low, there is a risk that the master cylinder will be damaged. As a solution to this problem, in the embodiment 2, in the pressure decrease mode, by opening the stroke simulator valve 17 and returning a part of the brake fluid to the fluid suction cylinder 15, an amount of the brake fluid that returns to the master cylinder M/C can be reduced, thereby protecting the master cylinder M/C.

At time t6, since the mode shifts from the pressure decrease mode to the holding mode, the solenoid-out valve 25 and the stroke simulator valve 17 are closed during a period from time t6 to time t7.

At time t7, since the mode shifts from the holding mode to the pressure increase mode, the proportional control of the solenoid-in valve 19 is performed, and the stroke simulator valve 17 is opened during a period from time t7 to time t8.

Here, in the related art brake control apparatus, when the pressure decrease mode of the ABS control is set, the brake fluid flowing out from the wheel cylinder is stored in the reservoir, then when the mode shifts to the pressure increase mode, the brake fluid stored in the reservoir is pumped up by the pump and is supplied to the wheel cylinder. At this time, response of the pressure increase of the wheel cylinder depends on a capacity of the pump. Thus there might occur a delay in the pressure increase operation from the pump operation start until the wheel cylinder pressure is actually increased, depending on the pump capacity.

In contrast to this, in the embodiment 2, the high pressure brake fluid stored in the fluid suction cylinder 15 in the pressure decrease mode can be supplied to the wheel cylinder W/C. Hence, it is possible to immediately increase the pressure of the wheel cylinder W/C independently of the pump capacity.

Operation after time t8 is the same as the above-explained operation from time t5 to t8. Its explanation will therefore be omitted here.

[Other Embodiments]

The embodiments of the present invention have been explained above on the basis of the embodiments 1 and 2. However, the configuration or system of the present invention is not limited to the embodiments 1 and 2.

Figure 10:
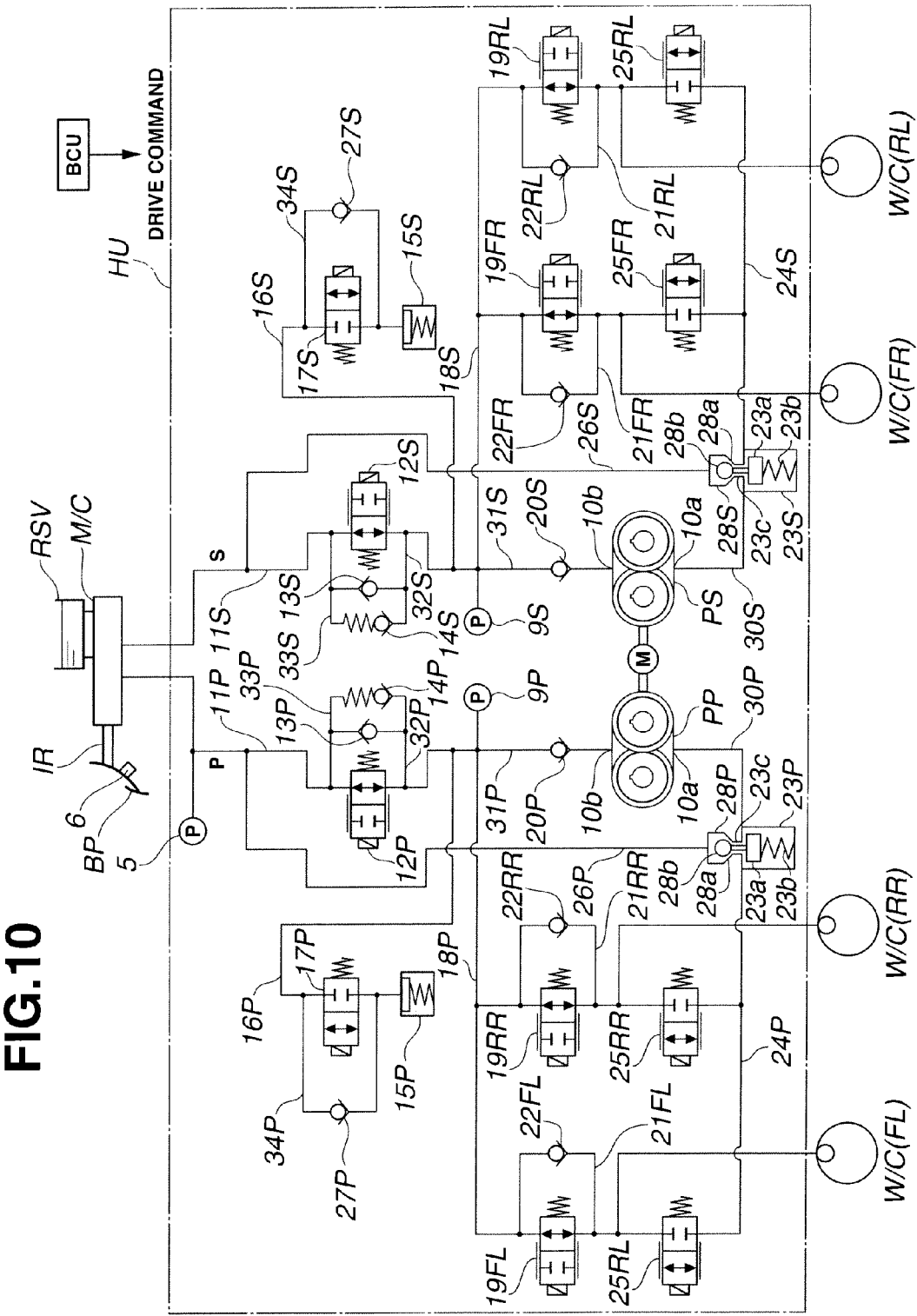
FIG. 10 is a hydraulic circuit of a brake control apparatus of other embodiment.

FIG. 10 is a hydraulic circuit of a brake control apparatus of other embodiment. This brake control apparatus differs from the system configuration of the embodiment 1 shown in FIG. 2 in that the negative pressure booster NPB is removed. This brake control apparatus also realizes the same regenerative brake cooperative control as the above embodiments. Further, in the case of the normal braking, by closing the gate-out valve 12 and operating the pump P from a state of FIG. 10, the wheel cylinder pressure can be increased with driver's brake operation force boosted.

The above embodiments can produce advantageous effects as described above. In addition to that, modified examples having substantially the same effects as the above embodiments will be explained below.

(a) In the brake control apparatus, the hydraulic pressure control unit BCU operates the outflow valve 25, having been in the valve closed state, in the valve opening direction after the predetermined time elapses.

By operating the outflow valve 25 so that the brake fluid does not flow out from the wheel cylinder W/C to the reservoir 23 for the predetermined time for which the brake operation amount increases, the occurrence of the rigid pedal feel, which is caused by the fact that the pump P can not pump up the brake fluid from the master cylinder M/C side upon the pomp operation, can be suppressed. And by permitting the flow-out of the brake fluid from the wheel cylinder W/C to the reservoir 23 after the predetermined time elapses, the brake shift from the friction braking force to the regenerative braking force can be achieved.

(b) The brake control apparatus further has: the one-way valve 14 arranged parallel to the gate-out valve 12 and allowing the flow of the brake fluid in the direction from the wheel cylinder W/C side toward the master cylinder M/C side by valve open when the preset front-to-back pressure difference of the valve is the predetermined value or greater, and the valve opening pressure of the one-way valve 14 is set to the hydraulic pressure value that exceeds the hydraulic pressure value equivalent to the maximum regenerative braking force which the regenerative braking system generates.

When storing the brake fluid in the fluid suction cylinder 15, since the gate-out valve 12 and the inflow valve 19 are closed then the pump P is operated, the internal pressure of the pipes 11 and 16 (the first brake circuit 11 and the branch oil passage 16) becomes high by the discharge pressure of the pump P. Thus by releasing the pressure of the valve opening pressure or more by the one-way valve 14, it is possible to prevent the breakage of the brake circuit caused by the excessive increase of the internal pressure of the pipes 11 and 16.

(c) In the brake control apparatus, the reservoir 23 has the piston 23*a* and the spring member 23*b* that forces the piston 23*a*, the regulation valve 28 has the seat part 28*a* that is formed at the inlet portion 23*c* of the reservoir 23 and the valve body 28*b* that is seated on the seat part 28*a*, and the stroke simulator is formed by following operations; (a) during no driver's brake operation, the valve body 28*b* is forced in the valve opening direction by the spring member 23*b*, and (b) during the control by the hydraulic pressure control unit BCU, the valve body 28*b* is operated in the valve closing direction or the valve opening direction in accordance with the inflow of the brake fluid from the master cylinder M/C and drive of the pump P.

The predetermined or desired pedal feel can be realized by the stroke simulator formed by the regulation valve 28 and the pump P.

(d) In the brake control apparatus, the fluid suction cylinder 15 is the accumulator that can store therein the brake fluid of the predetermined pressure or more, the hydraulic pressure control unit BCU has the anti-lock brake control section to suppress the lock state of the wheel by increasing/decreasing/holding the wheel cylinder pressure in accordance with the wheel state, and the anti-lock brake control section carries out the increase of the wheel cylinder pressure using the pressure of the accumulator with the switch valve 17 set in the valve open state.

With this, the pressure increase response of the wheel cylinder can be improved.

(e) The brake control apparatus used for the vehicle having the regenerative braking system, has: the pump P that can pump up brake fluid in the master cylinder M/C; the first brake circuit 11, 18 connecting the master cylinder M/C that generates the brake fluid pressure by driver's brake operation and the wheel cylinder W/C that is configured so that the brake fluid pressure acts on; the second brake circuit 31 connecting the first brake circuit 11, 18 and the outlet side 10*b* of the pump P; the gate-out valve 12 provided at the master cylinder M/C side with respect to the connection point of the second brake circuit 31, on the first brake circuit 11, 18; the third brake circuit 26 connecting the point positioned at the master cylinder M/C side with respect to the gate-out valve 12 and the inlet side 10*a* of the pump P, on the first brake circuit 11, 18; the inflow valve 19 provided at the wheel cylinder W/C side with respect to the connection point of the second brake circuit 31, on the first brake circuit 11, 18; the fourth brake circuit 24, 30 connecting the point positioned at the wheel cylinder W/C side with respect to the inflow valve 19 and the inlet side 10*a* of the pump P, on the first brake circuit 11, 18;

the outflow valve 25 provided on the fourth brake circuit 24, 30; the reservoir 23 provided, on the fourth brake circuit 24, 30, at the inlet side 10a of the pump P with respect to the outflow valve 25 and connecting to the third brake circuit 26; the accumulator 15 into which the brake fluid can flow, the accumulator 15 being able to store the brake fluid flowing into the accumulator 15; the branch oil passage 16 branching off from the point between the connection point of the second brake circuit 31 and the gate-out valve 12 on the first brake circuit 11, 18 and connecting to the accumulator 15; the switch valve 17 provided on the branch oil passage 16; and the regulation valve 28 provided on the third brake circuit 26 and regulating an amount of the brake fluid that flows into the reservoir 23 from the master cylinder M/C, and when the regenerative braking system works, the brake fluid flowing out from the master cylinder M/C by the driver's brake operation being stored in the accumulator 15 by a pump operation of the pump P through the third brake circuit 26, the regulation valve 28, the reservoir 23, the second brake circuit 31, the first brake circuit 11, 18 and the branch oil passage 16.

Since the pump P is operated and the brake fluid flowing out from the master cylinder M/C can be stored in the accumulator 15, the increase in the friction braking force can be prevented. The driver's required braking force is thus produced only by the regenerative braking force, and the energy recovery efficiency can be increased. In addition, it is possible to improve the pedal feel upon the execution of the regenerative brake cooperative control.

(f) The brake control apparatus further has: the hydraulic pressure control unit BCU controlling the brake fluid pressure by operating the gate-out valve 12, the inflow valve 19, the outflow valve 25, the switch valve 17 and the pump P in accordance with the regenerative operation state of the regenerative braking system.

With this, the good pedal feel can be realized while controlling the friction braking force in accordance with the regenerative operation state of the regenerative braking system.

(g) The brake control apparatus further has: the brake operation state detection section 5, 6 detecting the brake operation state of the driver, and when the brake operation is detected by the brake operation state detection section 5, 6 and the regenerative braking system works, the hydraulic pressure control unit BCU pours the brake fluid that flows out from the master cylinder M/C into the accumulator 15 by operating the gate-out valve 12 and the inflow valve 19 in the valve closing direction, operating the switch valve 17 in the valve opening direction and operating the pump P.

By closing the gate-out valve 12 and the inflow valve 19, the flowing-out of the brake fluid from the master cylinder M/C to the wheel cylinder W/C is restrained, and the increase in the friction braking force can be prevented. The driver's required braking force is thus produced only by the regenerative braking force, and an energy recovery efficiency can be increased. Also, by opening the switch valve 17 and operating the pump P, the brake fluid flowing out from the master cylinder M/C according to the driver's brake operation is released to the discharge side (the outlet section side) of the pump P, then good pedal feel same as the brake pedal characteristic of the normal braking can be obtained.

(h) In the brake control apparatus, when the regenerative braking force of the regenerative braking system lowers, the hydraulic pressure control unit BCU operates the inflow valve 19 in the valve opening direction according to the lowering of the regenerative braking amount and supplies the brake fluid stored in the accumulator 15 to the wheel cylinder W/C.

By operating the inflow valve 19 in the valve opening direction, it is possible to immediately increase the wheel cylinder pressure using the high pressure brake fluid stored in the accumulator 15, and the required braking force can be secured by the brake shift from the regenerative braking force to the friction braking force.

(i) In the brake control apparatus, when the regenerative braking system works while the brake fluid pressure generated by the driver's brake operation acts on the wheel cylinder W/C, the hydraulic pressure control unit BCU operates the gate-out valve 12 and the inflow valve 19 in the valve closing direction, operates the outflow valve 25 and the switch valve 17 in the valve opening direction and operates the pump P.

By operating the outflow valve 25 in the valve opening direction, the brake fluid flowing out from the wheel cylinder W/C to the reservoir 23 is pumped up by the pump P then is stored in the accumulator 15, and the brake shift from the friction braking force to the regenerative braking force can be achieved.

(j) In the brake control apparatus, when the regenerative braking system works also the increase in driver's brake operation amount is detected by the brake operation state detection section 5, 6 while the brake fluid pressure generated by the driver's brake operation acts on the wheel cylinder W/C, the hydraulic pressure control unit BCU operates the outflow valve 25 in the valve closing direction.

By operating the outflow valve 25 in the valve closing direction, the inflow of the brake fluid from the wheel cylinder W/C to the reservoir 23 can be restrained, then the occurrence of the rigid pedal feel, which is caused by the fact that the pump P can not pump up the brake fluid from the master cylinder M/C side, can be suppressed.

(k) In the brake control apparatus, the hydraulic pressure control unit BCU operates the outflow valve 25, having been in the valve closed state, in the valve opening direction after the predetermined time elapses.

By operating the outflow valve 25 so that the brake fluid does not flow out from the wheel cylinder W/C to the reservoir 23 for the predetermined time for which the brake operation amount increases, the occurrence of the rigid pedal feel, which is caused by the fact that the pump P can not pump up the brake fluid from the master cylinder M/C side upon the pomp operation, can be suppressed. And by permitting the flow-out of the brake fluid from the wheel cylinder W/C to the reservoir 23 after the predetermined time elapses, the brake shift from the friction braking force to the regenerative braking force can be achieved.

(l) In the brake control apparatus, the accumulator 15 is the accumulator that can store therein the brake fluid of the predetermined pressure or more, the hydraulic pressure control unit BCU has the anti-lock brake control section to suppress the lock state of the wheel by increasing/decreasing/holding the wheel cylinder pressure in accordance with the wheel state, and the anti-lock brake control section carries out the increase of the wheel cylinder pressure using the pressure of the accumulator with the switch valve 17 set in the valve open state.

With this, the pressure increase response of the wheel cylinder can be improved.

(m) In the brake control apparatus, the reservoir 23 has the piston 23a and the spring member 23b that forces the piston 23a, the regulation valve 28 has the seat part 28a that is formed at the inlet portion 23c of the reservoir 23 and the valve body 28b that is seated on the seat part 28a, and the stroke simulator is formed by following operations; (a) during no driver's brake operation, the valve body 28b is forced in the valve opening direction by the spring member 23b, and (b)

during the control by the hydraulic pressure control unit (BCU), the valve body 28b is operated in the valve closing direction or the valve opening direction in accordance with the inflow of the brake fluid from the master cylinder M/C and drive of the pump P.

The predetermined or desired pedal feel can be realized by the stroke simulator formed by the regulation valve 28 and the pump P.

(n) The brake control apparatus further has: the one-way valve 14 arranged parallel to the gate-out valve 12 and allowing the flow of the brake fluid in the direction from the wheel cylinder W/C side toward the master cylinder M/C side by valve open when the preset front-to-back pressure difference of the valve is the predetermined value or greater.

When storing the brake fluid in the accumulator 15, since the gate-out valve 12 and the inflow valve 19 are closed then the pump P is operated, the internal pressure of the pipes 11 and 16 (the first brake circuit 11 and the branch oil passage 16) becomes high by the discharge pressure of the pump P. Thus by releasing the pressure of the valve opening pressure or more by the one-way valve 14, it is possible to prevent the breakage of the brake circuit caused by the excessive increase of the internal pressure of the pipes 11 and 16.

(o) The method of the brake control for the vehicle having the regenerative braking system, the vehicle provided with the master cylinder M/C, the wheel cylinder W/C provided at the vehicle wheel, the brake circuit between the master cylinder M/C and the wheel cylinder W/C, the pump P and the fluid suction cylinder 15 both provided in the brake circuit, the method has: a brake fluid storing step that stores the brake fluid that flows out from the master cylinder M/C by the driver's brake operation in the fluid suction cylinder 15 by operating the pump P when the regenerative braking system works; and a brake fluid discharging step that supplies the brake fluid stored in the fluid suction cylinder 15 to the wheel cylinder W/C when the regenerative braking amount of the regenerative braking system lowers.

With this, it is possible to perform the brake shift between the friction braking force and the regenerative braking force while keeping the good pedal feel.

The entire contents of Japanese Patent Application No. 2010-288389 filed on Dec. 24, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus for a vehicle having a regenerative braking system, comprising:
    a pump;
    a first brake circuit connecting a master cylinder that generates a brake fluid pressure by a brake operation of a driver and a wheel cylinder configured so that the brake fluid pressure acts on the wheel cylinder;
    a second brake circuit connecting the first brake circuit and an outlet side of the pump:
    a gate-out valve provided at a master cylinder side with respect to a connection point for the second brake circuit on the first brake circuit;
    a third brake circuit connecting a point on the first brake circuit at the master cylinder side with respect to the gate-out valve and an inlet side of the pump;
    an inflow valve provided at a wheel cylinder side with respect to the connection point for the second brake circuit on the first brake circuit:
    a fourth brake circuit connecting a point on the first brake circuit at the wheel cylinder side with respect to the inflow valve and the inlet side of the pump;
    an outflow valve provided on the fourth brake circuit;
    a reservoir provided on the fourth brake circuit at the inlet side of the pump with respect to the outflow valve and connecting to the third brake circuit;
    a fluid suction cylinder configured to receive a flow of the brake fluid;
    a branch oil passage branching off from a point between the connection point for the second brake circuit and the gate-out valve on the first brake circuit and connecting to the fluid suction cylinder;
    a switch valve provided on the branch oil passage;
    a regulation valve provided on the third brake circuit and configured to regulate an amount of the brake fluid that flows into the reservoir from the master cylinder; and
    a hydraulic pressure control unit configured to control the brake fluid pressure by operating the gate-out valve, the inflow valve, the outflow valve, the switch valve and the pump in accordance with a regenerative operation state of the regenerative braking system.

2. The brake control apparatus as claimed in claim 1, further comprising:
    a brake operation state detection section configured to detect a brake operation state of a driver,
    wherein when hen the brake operation is detected by the brake operation state detection section and the regenerative braking system is in operation, the hydraulic pressure control unit is configured to cause a flow of the brake fluid from the master cylinder into the fluid suction cylinder by operating the gate-out valve and the inflow valve in a valve closing direction, operating the switch valve in a valve opening direction and operating the pump.

3. The brake control apparatus as claimed in claim 2, wherein:
    when a regenerative braking amount of the regenerative braking system lowers, the hydraulic pressure control unit is configured to operate the inflow valve in the valve opening direction according to the lowering of the regenerative braking amount and supply the brake fluid that already flows into the fluid suction cylinder to the wheel cylinder.

4. The brake control apparatus as claimed in claim 2, wherein when the regenerative braking system is in operation while the brake fluid pressure generated by the brake operation of the driver acts on the wheel cylinder, the hydraulic pressure control unit is configured to
    operate the gate-out valve and the inflow valve in the valve closing direction,
    operate the outflow valve and the switch valve in the valve opening direction, and
    operate the pump.

5. The brake control apparatus as claimed in claim 4, wherein:
    when the regenerative braking system is in operation and an increase in an amount of the brake operation of the driver is detected by the brake operation state detection section while the brake fluid pressure generated by the brake operation of the driver acts on the wheel cylinder, the hydraulic pressure control unit is configured to operate the outflow valve in the valve closing direction.

6. The brake control apparatus as claimed in claim 5, wherein:
the hydraulic pressure control unit is configured to operate the outflow valve, having been in a valve closed state, in the valve opening direction after a predetermined time elapses.

7. The brake control apparatus as claimed in claim 1, further comprising:
a one-way valve arranged parallel to the gate-out valve and configured to permit a flow of the brake fluid in a direction from the wheel cylinder side toward the master cylinder side by opening when a preset front-to-back pressure difference is a predetermined value or greater,
wherein a valve opening pressure of the one-way valve is set to a hydraulic pressure value equivalent to a maximum regenerative braking force which the regenerative braking system generates.

8. The brake control apparatus as claimed in claim 1, wherein:
the reservoir has a piston and a spring member that forces the piston,
the regulation valve has a seat part that is formed at an inlet portion of the reservoir and a valve body that is seated on the seat part, and
a stroke simulator is formed by:
  (a) during no brake operation of the driver, forcing the valve body in a valve opening direction by the spring member, and
  (b) during control by the hydraulic pressure control unit, operating the valve body in a valve closing direction or the valve opening direction in accordance with an inflow of the brake fluid from the master cylinder and drive of the pump.

9. The brake control apparatus as claimed in claim 1, wherein:
the fluid suction cylinder is an accumulator configured to store therein brake fluid having a predetermined pressure or more,
the hydraulic pressure control unit has an anti-lock brake control section configured to suppress a lock state of a wheel by increasing, decreasing, or holding a wheel cylinder pressure in accordance with a wheel state, and
the anti-lock brake control section is configured to carry out the increase of the wheel cylinder pressure using a pressure of the accumulator with the switch valve set in a valve open state.

10. A brake control apparatus for a vehicle having a regenerative braking system, comprising:
a pump that can pump up brake fluid in a master cylinder;
a first brake circuit connecting the master cylinder that generates a brake fluid pressure by a brake operation of a driver and a wheel cylinder that is configured so that the brake fluid pressure acts on the wheel cylinder;
a second brake circuit connecting the first brake circuit and an outlet side of the pump;
a gate-out valve provided at a master cylinder side with respect to a connection point for the second brake circuit on the first brake circuit;
a third brake circuit connecting a point on the first brake circuit at the master cylinder side with respect to the gate-out valve and an inlet side of the pump;
an inflow valve provided at a wheel cylinder side with respect to the connection point for the second brake circuit on the first brake circuit;
a fourth brake circuit connecting a point on the first brake circuit at the wheel cylinder side with respect to the inflow valve and the inlet side of the pump;
an outflow valve provided on the fourth brake circuit;
a reservoir provided on the fourth brake circuit at the inlet side of the pump with respect to the outflow valve and connecting to the third brake circuit;
an accumulator cylinder configured to receive a flow of the brake fluid and to store the brake fluid flowing into the accumulator;
a branch oil passage branching off from a point between the connection point for the second brake circuit and the gate-out valve on the first brake circuit and connecting to the accumulator;
a switch valve provided on the branch oil passage; and
a regulation valve provided on the third brake circuit and configured to regulate an amount of the brake fluid that flows into the reservoir from the master cylinder,
wherein when the regenerative braking system is in operation, the brake fluid flowing out from the master cylinder by the brake operation of the driver is stored in the accumulator by a pump operation of the pump through the third brake circuit, the regulation valve, the reservoir, the second brake circuit, the first brake circuit and the branch oil passage.

11. The brake control apparatus as claimed in claim 10, further comprising:
a hydraulic pressure control unit configured to control the brake fluid pressure by operating the gate-out valve, the inflow valve, the outflow valve, the switch valve and the pump in accordance With a regenerative operation state of the regenerative braking system.

12. The brake control apparatus as claimed in claim 11, further comprising:
a brake operation state detection section configured to detect a brake operation state of a driver,
wherein when the brake operation is detected by the brake operation state detection section and the regenerative braking system is in operation, the hydraulic pressure control unit is configured to cause a flow of the brake fluid from the master cylinder into the accumulator by operating the gate-out valve and the inflow valve in a valve closing direction, operating the switch valve in a valve opening direction and operating the pump.

13. The brake control apparatus as claimed in claim 12, wherein:
when a regenerative braking amount of the regenerative braking system lowers, the hydraulic pressure control unit is configured to operate the inflow valve in the valve opening direction according to the lowering of the regenerative braking amount and supply the brake fluid stored in the accumulator to the wheel cylinder.

14. The brake control apparatus as claimed in claim 13, wherein when the regenerative braking system is in operation while the brake fluid pressure generated by the brake operation of the driver acts on the wheel cylinder, the hydraulic pressure control unit is configured to:
operate the gate-out valve and the inflow valve in the valve closing direction,
operate the outflow valve and the switch valve in the valve opening direction, and
operate the pump.

15. The brake control apparatus as claimed in claim 14, wherein:
when the regenerative braking system is in operation and an increase in an amount of the brake operation of the driver is detected by the brake operation state detection section while the brake fluid pressure generated by the brake operation of the driver acts on the wheel cylinder, the hydraulic pressure control unit is configured to operate the outflow valve in the valve closing direction.

16. The brake control apparatus as claimed in claim 15, wherein:
the hydraulic pressure control unit is configured to operate the outflow valve, having been in a valve closed state, in the valve opening direction after a predetermined time elapses.

17. The brake control apparatus as claimed in claim 16, wherein:
the accumulator is an accumulator configured to store therein brake fluid having a predetermined pressure or more,
the hydraulic pressure control unit has an anti-lock brake control section configured to suppress a lock state of a wheel by increasing, decreasing, or holding a wheel cylinder pressure in accordance with a wheel state, and
the anti-lock brake control section is configured to carry out the increase of the wheel cylinder pressure using a pressure of the accumulator with the switch valve set in a valve open state.

18. The brake control apparatus as claimed in claim 17, wherein:
the reservoir has a piston and a spring member that forces the piston,
the regulation valve has a seat part that is formed at an inlet portion of the reservoir and a valve body that is seated on the seat part, and
a stroke simulator is formed by:
(a) during no brake operation of the driver, forcing the valve body in a valve opening direction by the spring member, and
(b) during control by the hydraulic pressure control unit, operating the valve body in a valve closing direction or the valve opening direction in accordance with an inflow of the brake fluid from the master cylinder and drive of the pump.

19. The brake control apparatus as claimed in claim 11, further comprising:
a one-way valve arranged parallel to the gate-out valve and configured to allow a flow of the brake fluid in a direction from the wheel cylinder side toward the master cylinder side by opening when a preset front-to-back pressure difference is a predetermined value or greater.

* * * * *